Figure 6:
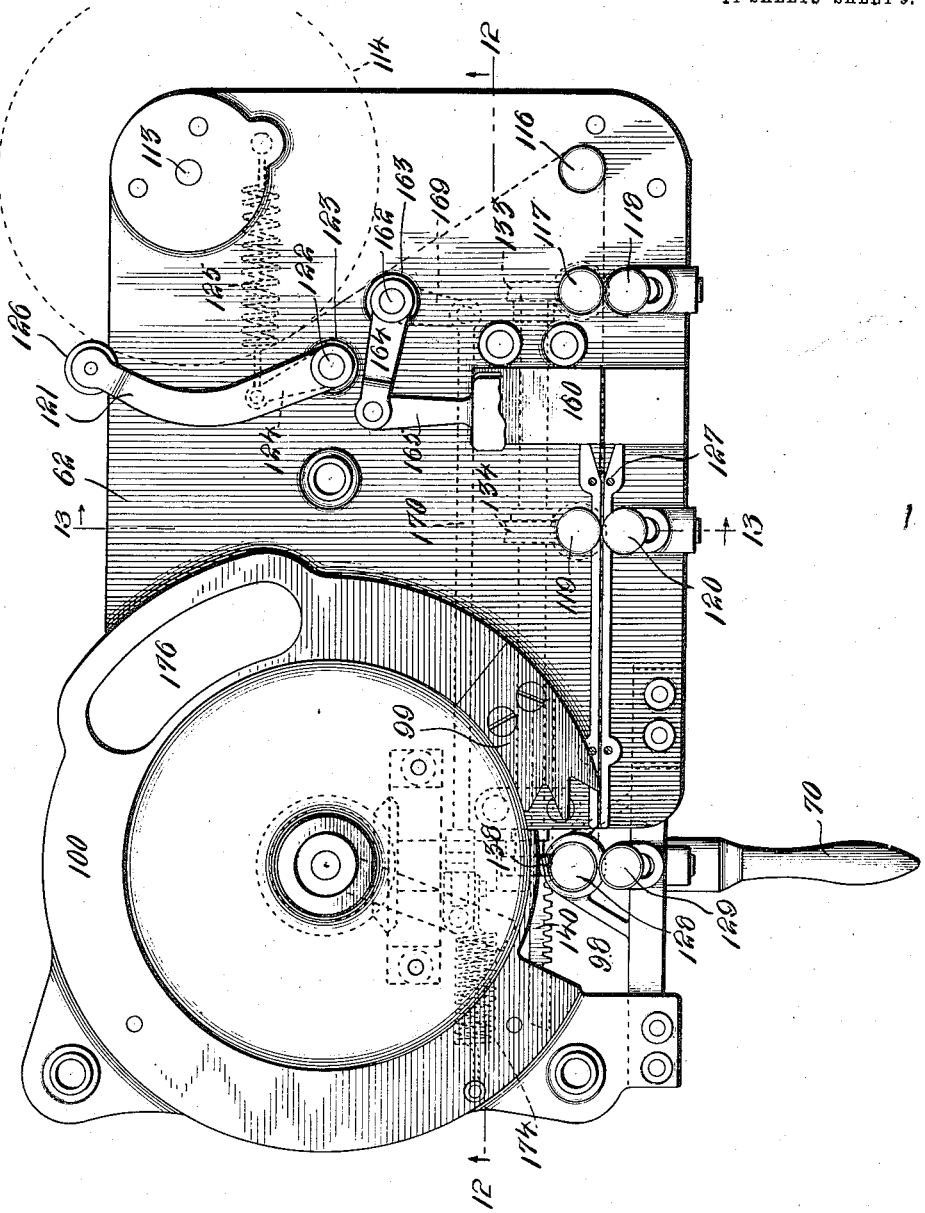

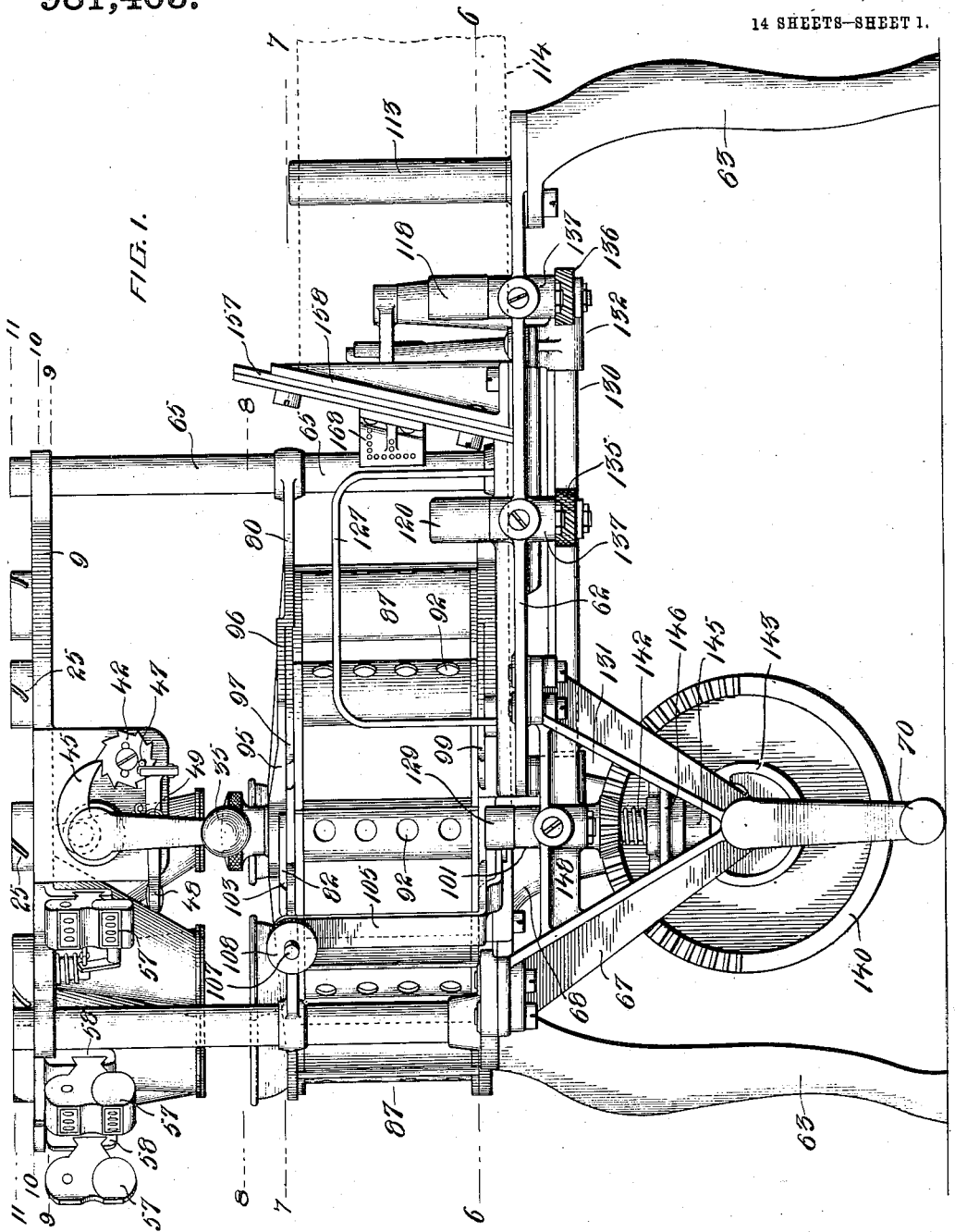

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 2.
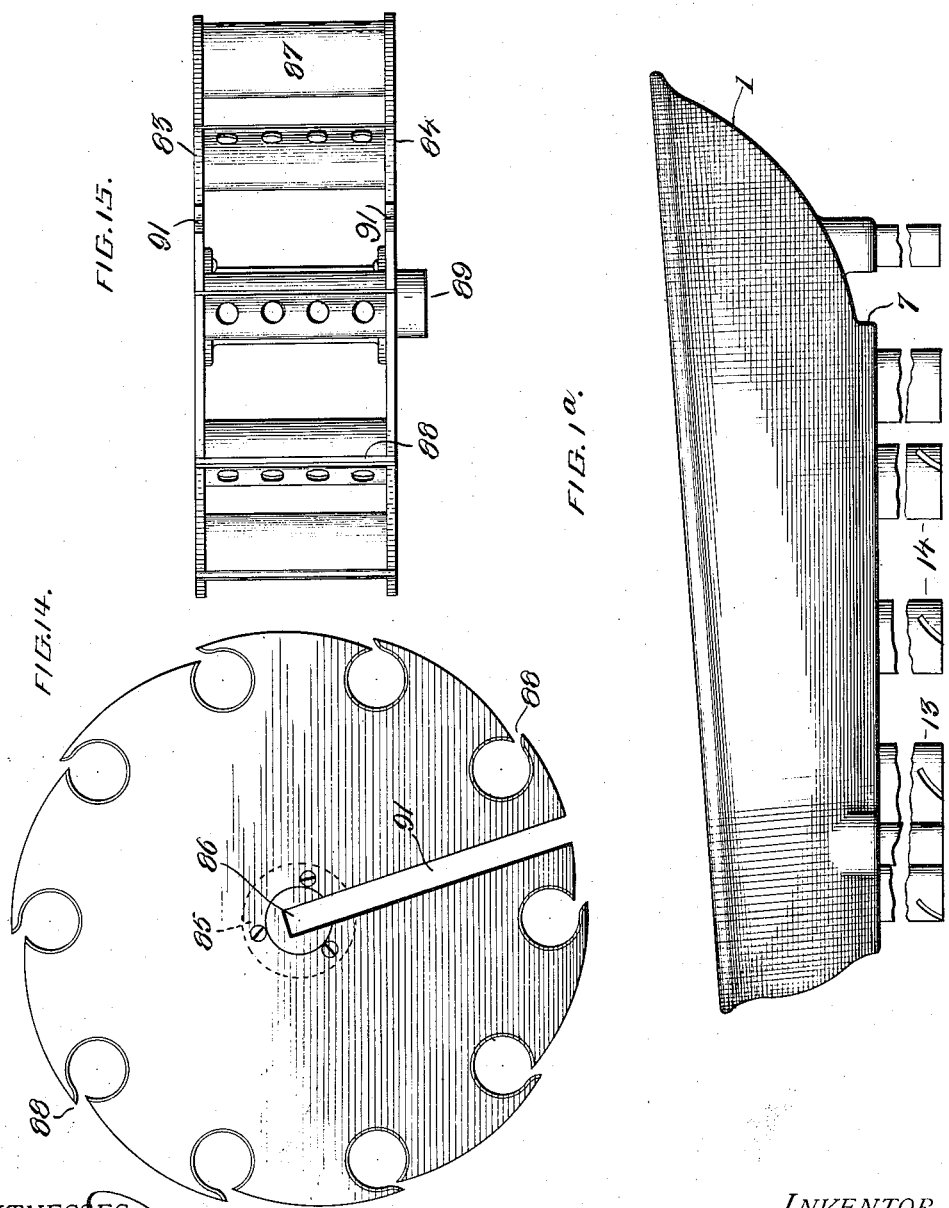
WITNESSES:
INVENTOR
BY John J. Farrell
Attorney

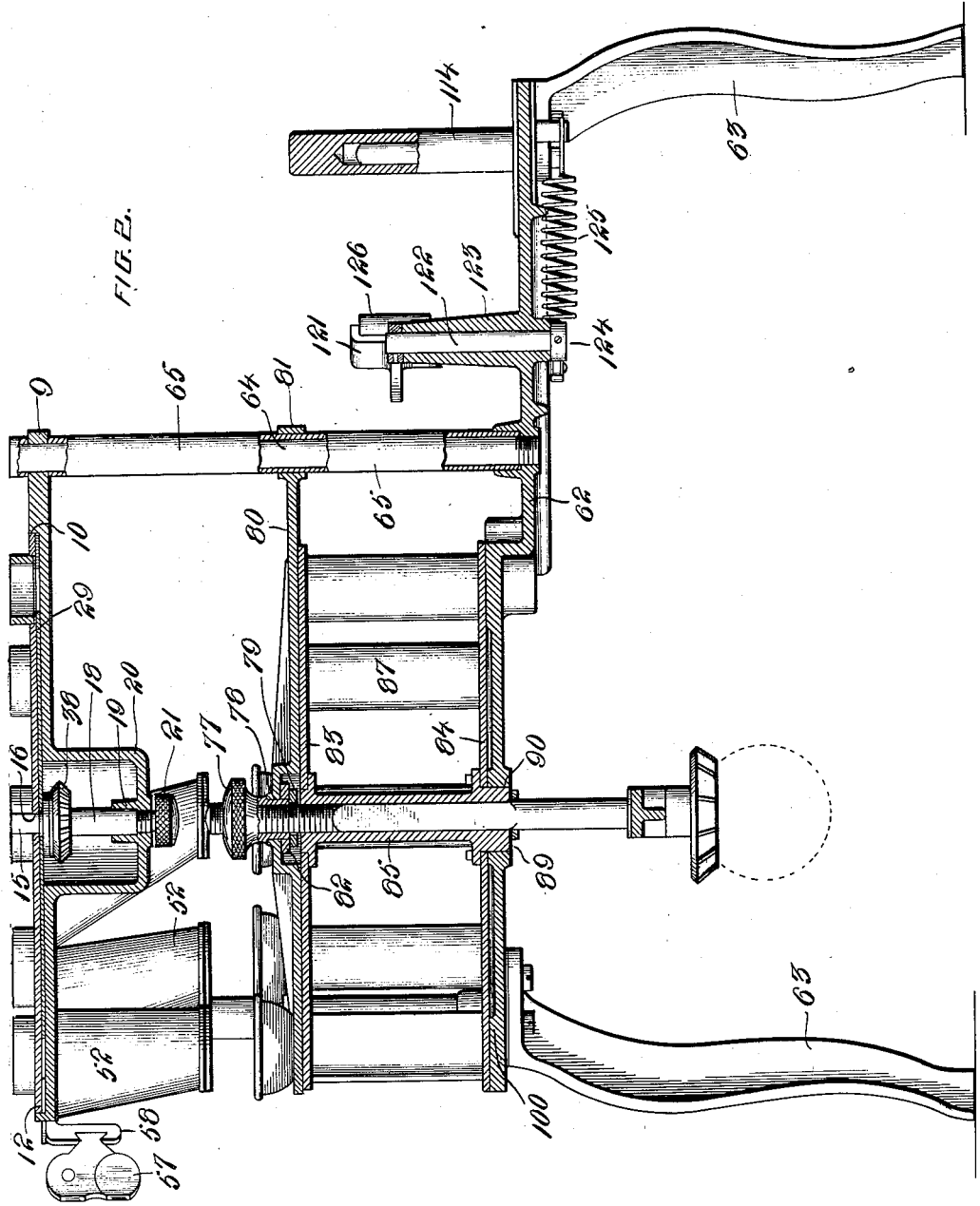

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 4.
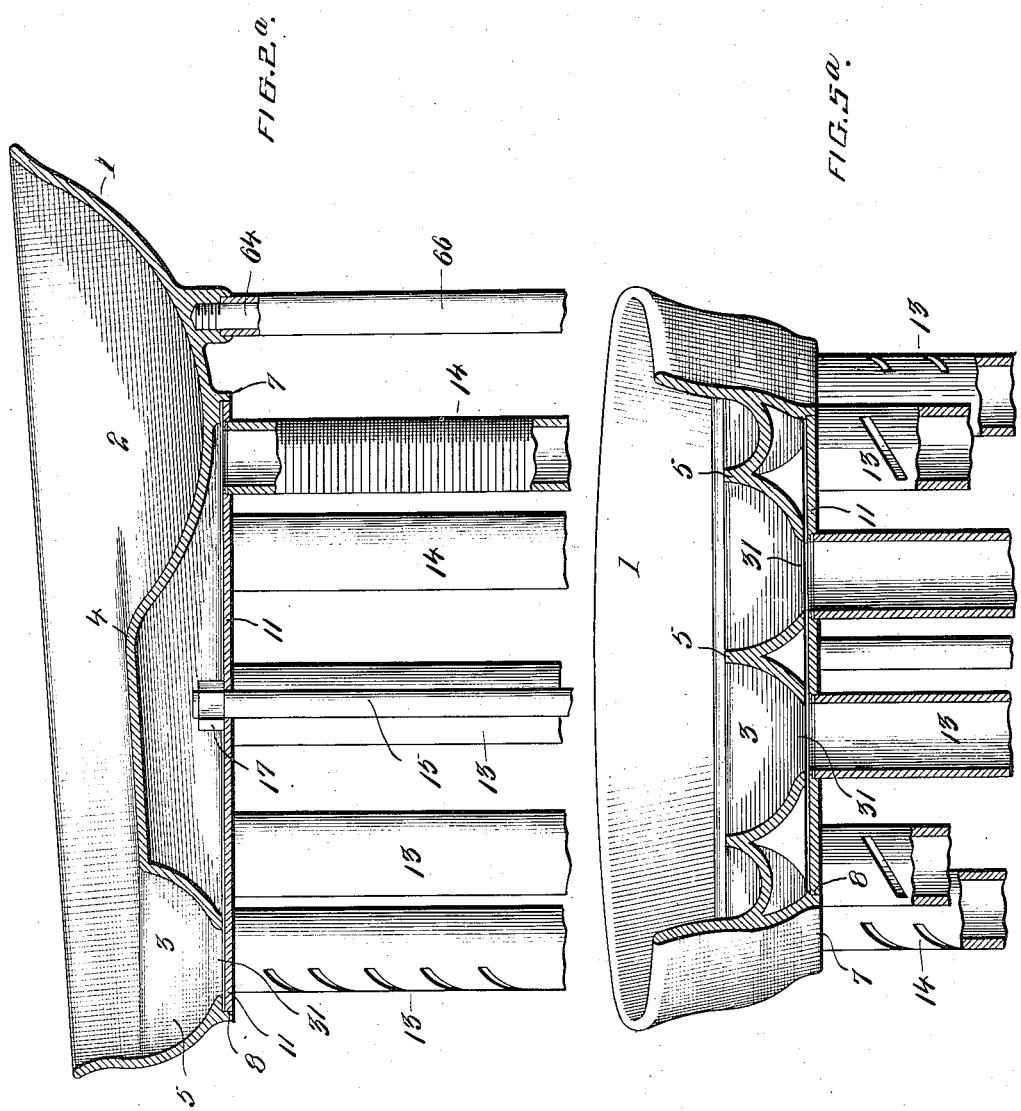

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 5.
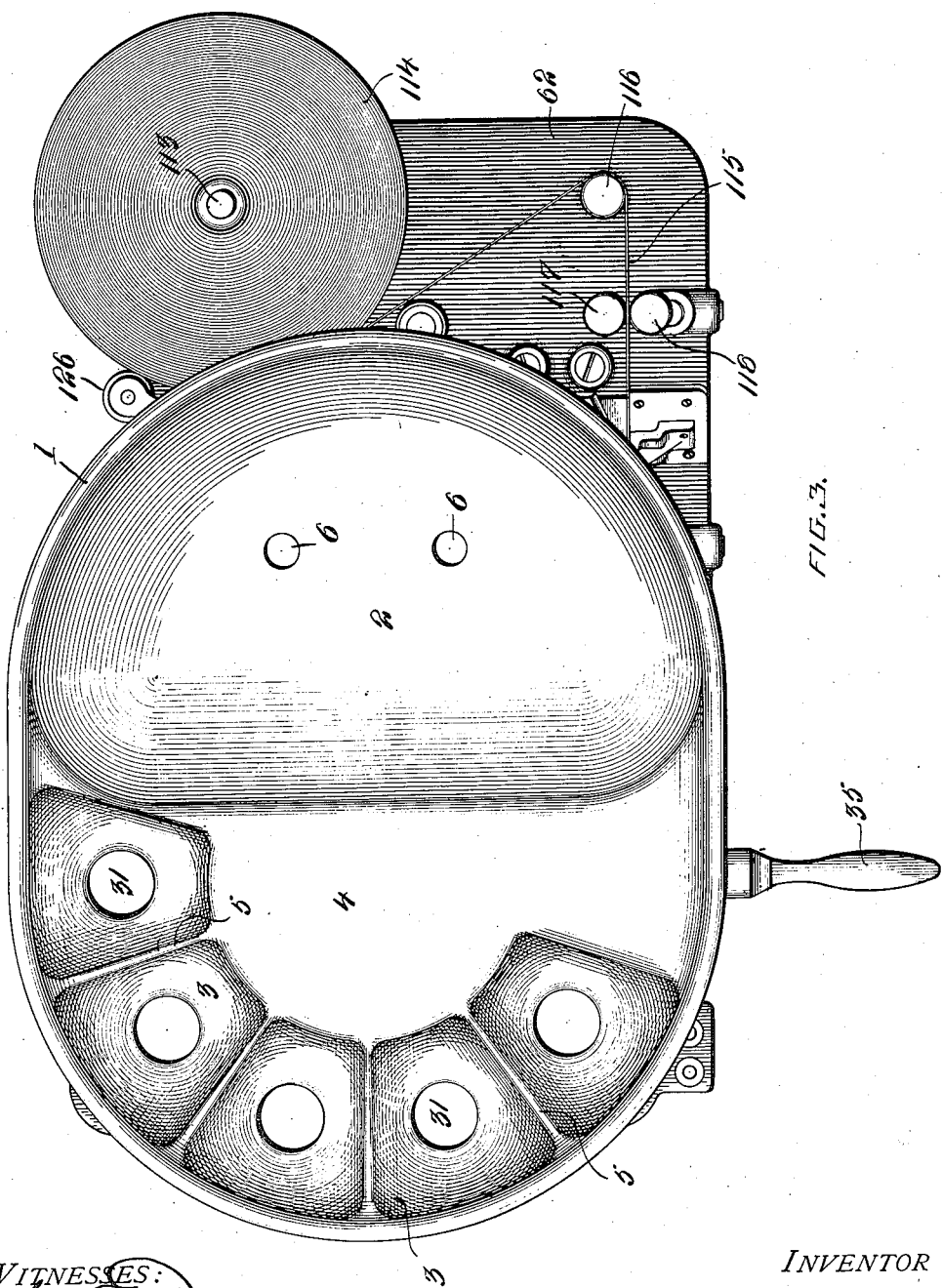
WITNESSES:
INVENTOR
BY John J. Farrell
Attorney

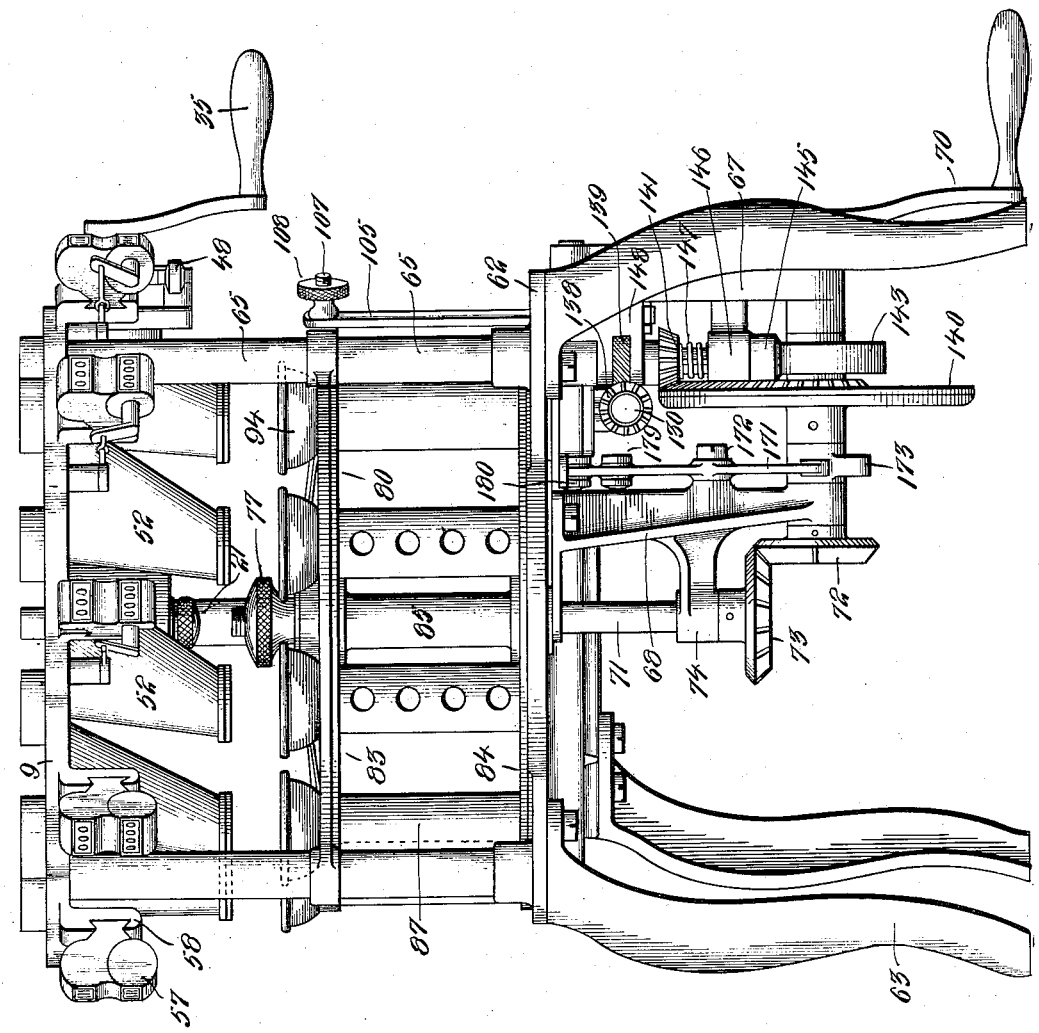

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 7.
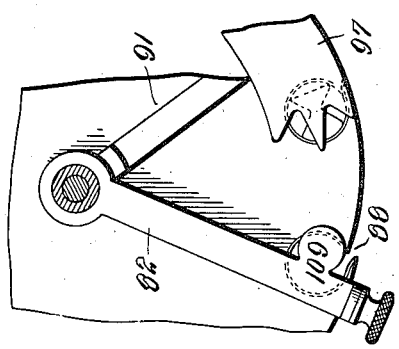
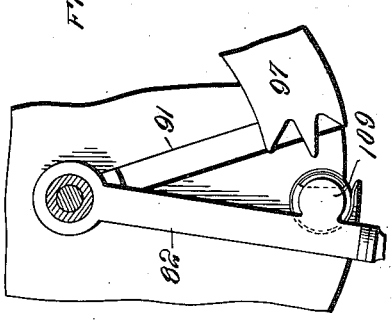
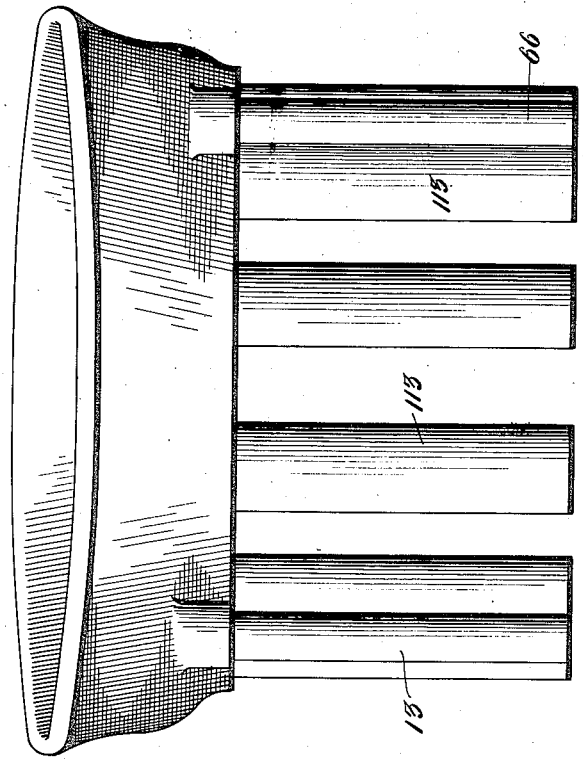
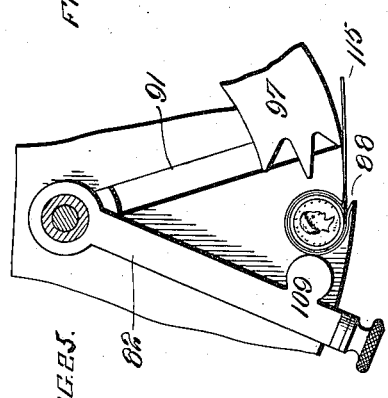
WITNESSES:
INVENTOR
BY
Attorney

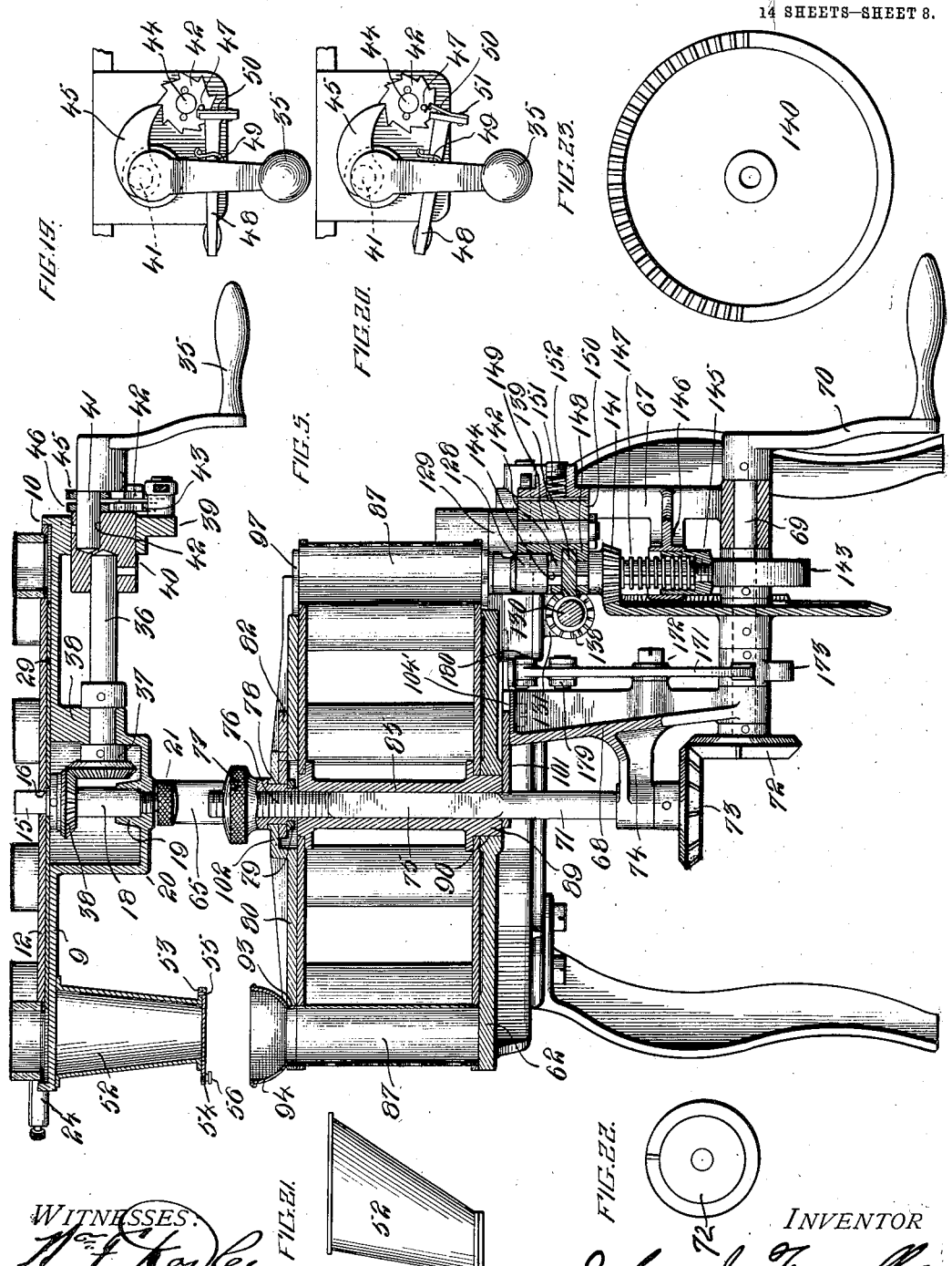

J. J. FARRELL.
MACHINE FOR COUNTING AND PACKAGING COINS.
APPLICATION FILED OCT. 26, 1908.

981,403.

Patented Jan. 10, 1911.

14 SHEETS—SHEET 9.

J. J. FARRELL.
MACHINE FOR COUNTING AND PACKAGING COINS.
APPLICATION FILED OCT. 26, 1908.

981,403.

Patented Jan. 10, 1911.
14 SHEETS—SHEET 10.

WITNESSES:

INVENTOR
John J. Farrell
BY
Attorney

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 11.
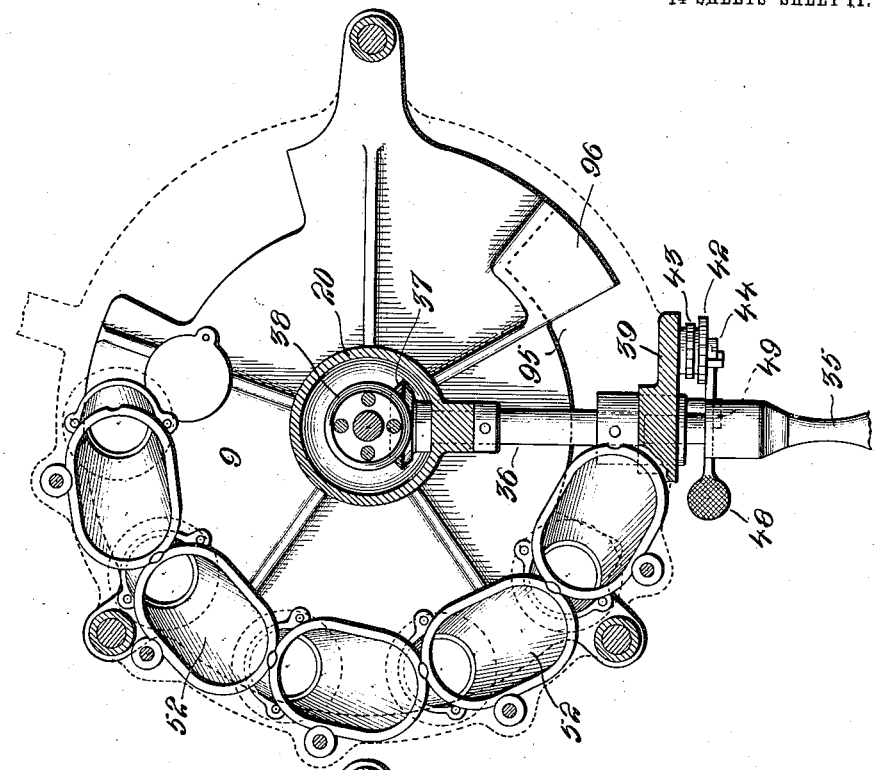
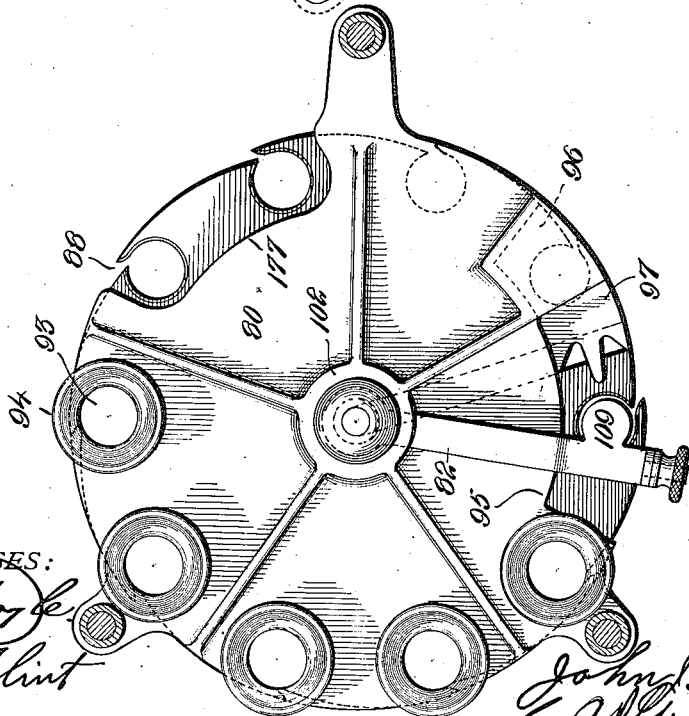

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 12.
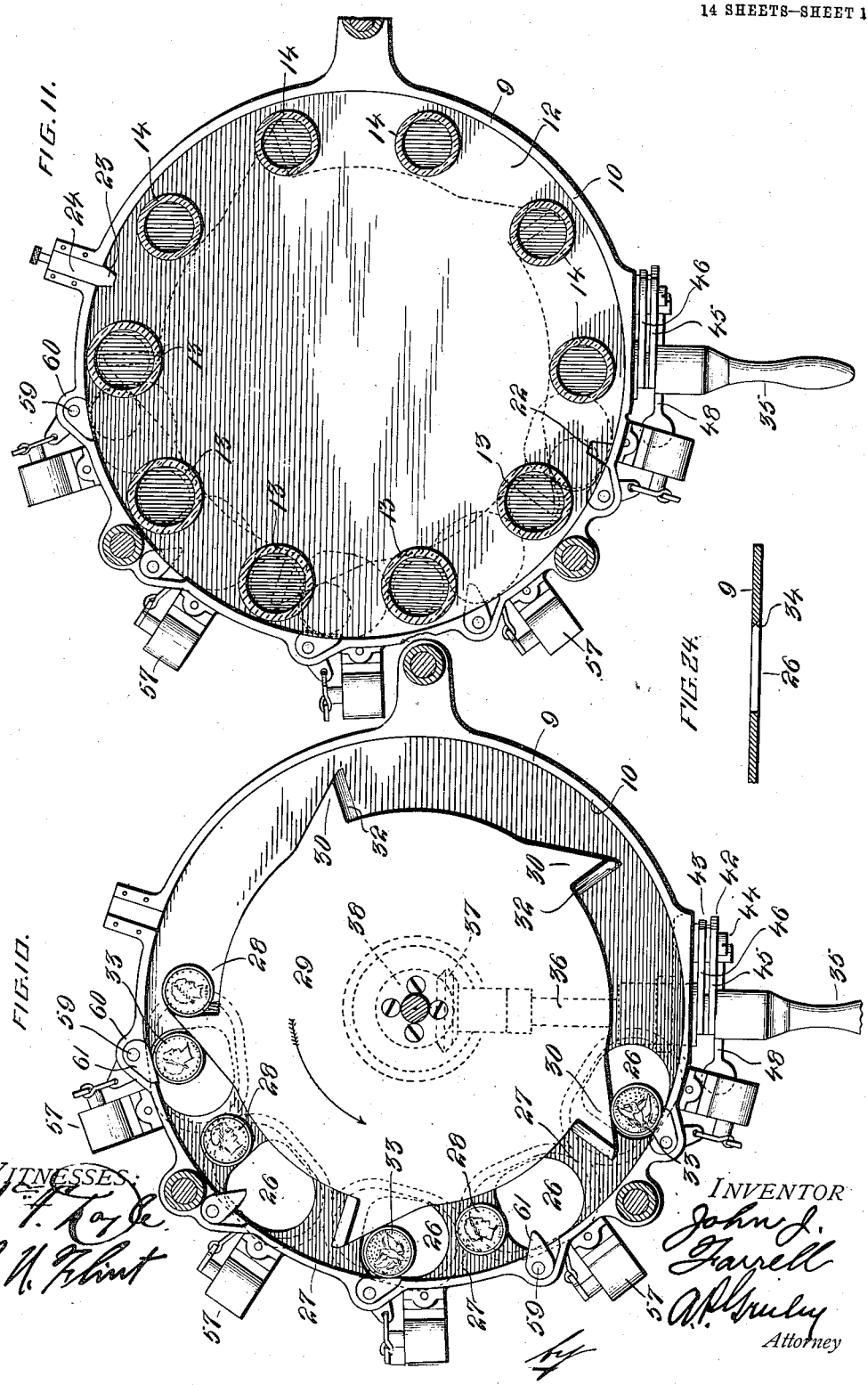

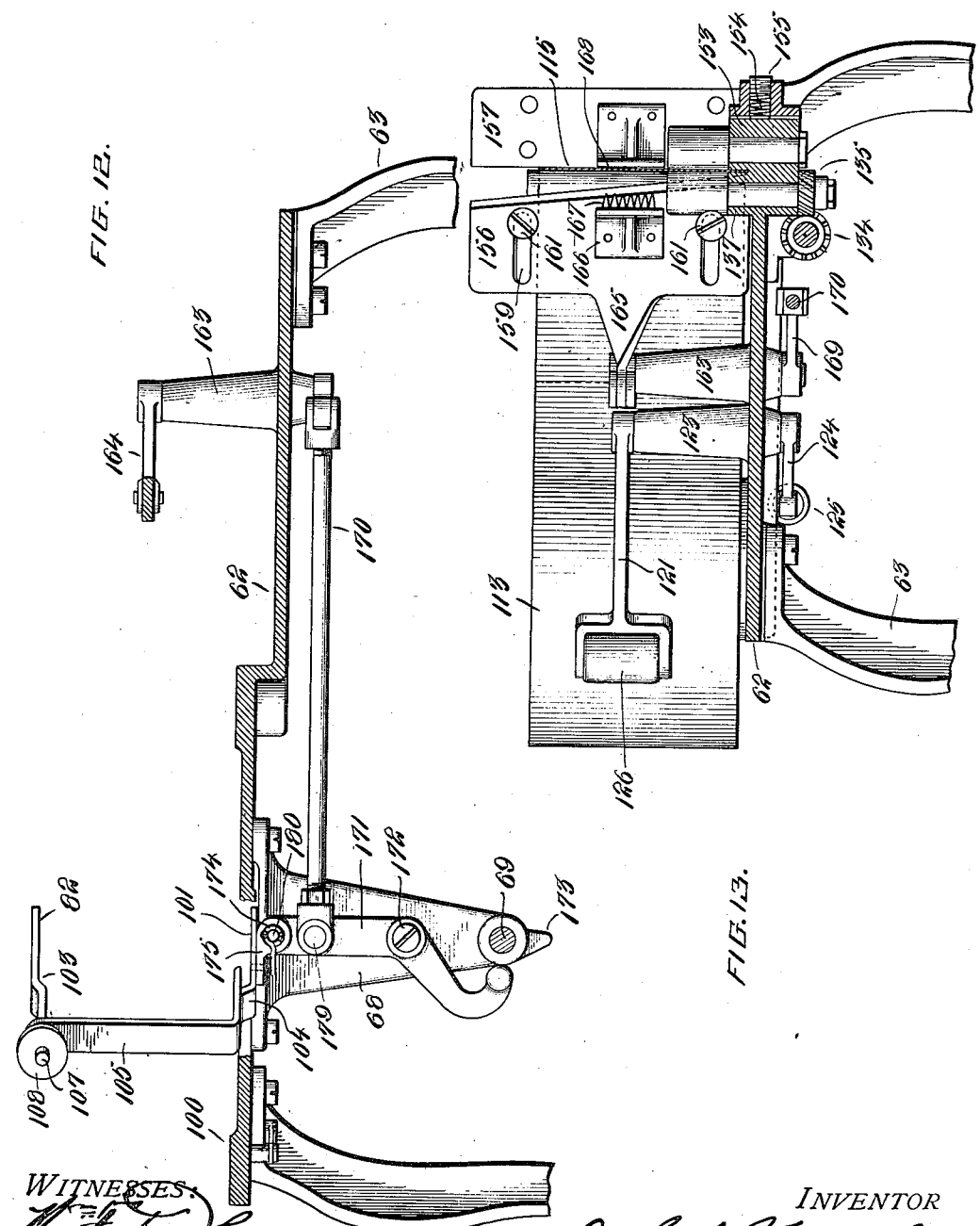

J. J. FARRELL.
MACHINE FOR COUNTING AND PACKAGING COINS.
APPLICATION FILED OCT. 26, 1908.
981,403.
Patented Jan. 10, 1911.
14 SHEETS—SHEET 14.
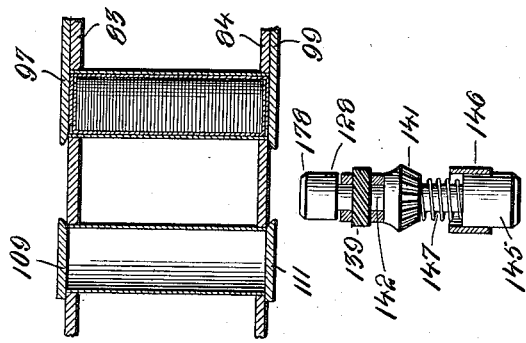
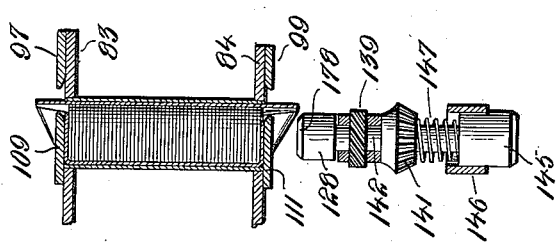
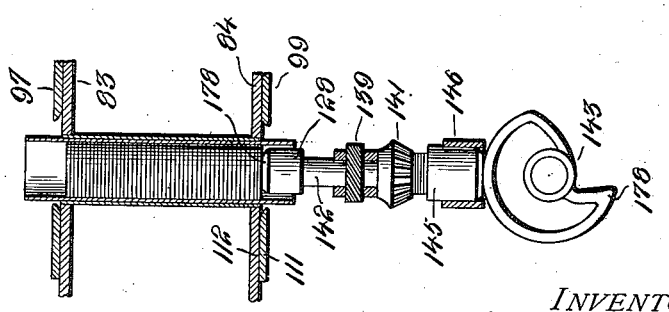
WITNESSES:
INVENTOR
John J. Farrell
BY
Attorney

UNITED STATES PATENT OFFICE.

JOHN JAMES FARRELL, OF SOUTH ARDMORE, PENNSYLVANIA.

MACHINE FOR COUNTING AND PACKAGING COINS.

981,403.   Specification of Letters Patent.   Patented Jan. 10, 1911.

Application filed October 26, 1908. Serial No. 459,656.

*To all whom it may concern:*

Be it known that I, JOHN JAMES FARRELL, a citizen of the United States, residing at South Ardmore, in the county of Delaware, State of Pennsylvania, have invented certain new and useful Improvements in Machines for Counting and Packaging Coins, of which the following is a description, reference being had to the accompanying drawings, forming a part hereof.

My invention relates to a machine for operating upon a mass of coins, all of one denomination, but includes features of adjustment whereby it may be used with coins of various denominations, it being understood however that when in any given condition of adjustment the coins operated upon at one time will be all of one denomination. When performing the greatest number of distinct operations of which it is capable the machine will act to count a plurality of collections of coins from the mass of coins operated upon, each collection comprising a definite and predetermined number of coins and having therefore a definite value; to gather or collect the several collections of coins thus produced in suitable collecting or receiving mechanism, it being understood that the several collections of coins are kept separate after having been once formed; and to wrap the several collections of coins with paper while they remain in said collecting mechanism; and my invention includes mechanism to be disclosed hereinafter whereby the function of counting, collecting and wrapping the coins as above stated may be performed as an entirety; and subordinate mechanisms whereby each of the separate operations which collectively constitute the function of the machine as a whole may be performed; and also auxiliary devices used in connection with each of said mechanisms and contributing to the performance of the several operations enumerated.

While the final result of the operation of the machine hereinafter disclosed and in which my invention is embodied is that packages of coins are discharged therefrom wrapped in paper and each package having a definite value, the machine is designed with reference to and is capable of counting coins without collecting them in collections having each a definite number of coins; and is also capable of counting coins and collecting them into collections each having a definite but not necessarily an invariable number of coins, by virtue of which feature the machine may be used as a change making device; and is also capable of counting coins and collecting them into collections each having a definite and predetermined value and discharging said collections from the machine without wrapping them, by virtue of which feature unwrapped stacks of coins each stack of definite value may be formed, and which stacks may obviously be handled as units in unwrapped condition or may be wrapped by hand or by other machines; and is also capable of wrapping collections of coins counted by hand or by other machines, in which case the machine operates to wrap coins but not to count or collect them into collections of definite value.

With the above features in view, my invention consists in the machine shown in the accompanying drawings, described in the following specification, and particularly pointed out in the claims.

Figure 7:
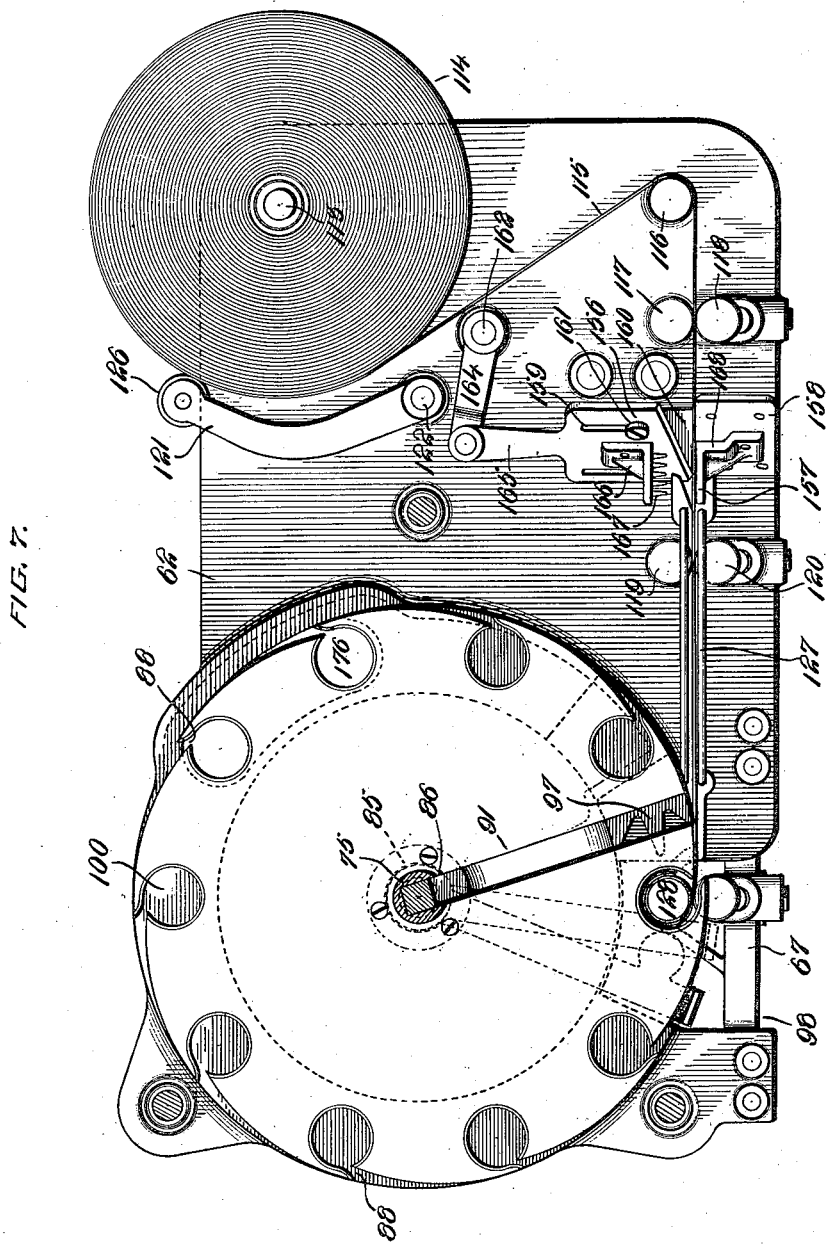

In the accompanying drawings: Figure 1 is a view showing the lower portion of the machine in side elevation. Fig. 1$^a$ is a corresponding side elevation of the upper portion of the machine, portions thereof being broken away. Fig. 2 is a sectional elevation taken upon a vertical plane passing through the center of the machine, and showing the lower portion thereof. Fig. 2$^a$ is a corresponding sectional elevation of the upper portion of the machine. Fig. 3 is a plan view of the machine. Fig. 4 is a view showing the lower portion of the machine in end elevation, as seen from a point to the left of Fig. 1. Fig. 4$^a$ is a corresponding end elevation of the upper portion of the machine. Fig. 5 is a sectional elevation taken upon a vertical plane passing through the principal operating mechanism adjacent one end of the machine, and showing the lower portion thereof. Fig. 5$^a$ is a fragmentary view taken upon a vertical transverse plane passing through the upper portion of the machine. Fig. 6 is a plan view of the base of the machine, portions detachable therefrom and located above the line 6—6 Fig. 1 being omitted. Fig. 7 is a sectional plan view taken upon a horizontal plane indicated by the line 7, 7, Fig.

1. Fig. 8 is a plan view of an adjusting plate and crimping device as seen from the plane 8—8 Fig. 1, other elements being omitted. Fig. 9 is a plan view of the same plate, and certain of the other elements of my machine as seen from the plane 9—9 Fig. 1. Fig. 10 is a view taken upon a horizontal plane indicated by the line 10—10 Fig. 1, and illustrating the operation of certain counting mechanism, other parts being omitted. Fig. 11 is a view taken upon a horizontal plane indicated by the line 11—11 Fig. 1. Fig. 12 is a fragmentary sectional view for illustrating the operation of various elements, said view being upon a vertical plane indicated by the line 12—12 Fig. 6. Fig. 13 is a view taken upon a vertical plane indicated by the line 13—13 Fig. 6 and looking toward the right. Fig. 14 is a plan view of a coin wrapping magazine. Fig. 15 is a view showing said magazine in elevation. Figs. 16, 17 and 18 are views illustrating crimping and folding mechanism in various positions and serving to explain the operation thereof. Figs. 19 and 20 are views showing certain stopping mechanism in two positions, and serving to explain the operation thereof. Fig. 21 is a side view of a hopper. Fig. 22 is a view of the mutilated gear 72. Fig. 23 is a view of the mutilated gear 140. Fig. 24 is a sectional view taken through one of the openings 26. Fig. 25 is a detail plan view showing the crimping device in position to crimp in the upper end of the paper tube surrounding a column of coins. Fig. 26 is a similar view showing the crimping device in crimping position, and Fig. 27 is a similar view showing the coin tube moved forward to bring the crimped in end of the paper tube into contact with the folding device.

In the drawings 1 is a hopper designed to receive coins all of one denomination and which coins are to be counted and wrapped into packages each containing a definite number of coins and therefore having a definite value. This hopper is oval in form as seen in plan and is formed with a large depressed portion 2 at one end constituting nearly one half the total area of the hopper and into which the mass of coins to be operated upon are placed; and a plurality of depressions or pockets 3 having openings 31 at their lower ends are formed in the other end of the bottom of the hopper 1, five such pockets being shown in the machine illustrated although the number of such pockets may be varied as the operation of the machine is in no way dependent upon the number of such pockets provided in a given machine, the employment of a plurality of pockets being for the purpose of increasing the capacity of the machine. The bottom 4 of the hopper 1 between the depressed portion 2 thereof and the pockets 3 is inclined toward the said pockets, so that coins will pass easily from the portion 2 across the bottom 4 and into the several pockets 3, it being understood that the coins in the hopper 1 are manipulated by the operator to cause them to pass to the pockets 3. The several pockets 3 are separated from one another by partitions 5 the upper edges of which rise to the plane of the inclined bottom 4 of the hopper.

6, 6 are holes provided in the bottom of the depressed portion 2 the purpose of which is to prevent the accumulation of dirt in the said depression.

The under side of the hopper 1 is provided with an annular rib 7 which is rabbeted as at 8 and which rabbet receives the upper end of an element comprising a plurality of receiving tubes to be hereinafter referred to as a coin receiving magazine.

9 is a supporting plate extending across the machine and forming a support for the coin receiving magazine, the counting mechanism, and various other mechanism coöperating therewith, all to be more fully hereinafter described, the upper face of which plate is provided with an annular rabbet 10. Interposed between the supporting plate 9 and the bottom of the hopper 1 is a coin receiving magazine comprising two circular disks or end plates 11 and 12 adapted to fit and bear within the rabbets 8 and 10 of the hopper 1 and supporting plate 9 respectively, together with a plurality of coin receiving tubes which extend between and are supported at their ends in openings in said plates 11 and 12. I preferably arrange said tubes in a plurality of groups made up of like tubes and ten of such tubes are shown in the embodiment of my machine as illustrated, see Fig. 11, said tubes being arranged in two groups. The five tubes to which the numeral 13 is applied constitute one group, and all of the tubes of this group are of the same diameter, the diameter chosen being such as to adapt the tubes to receive either quarter dollar or five cent pieces; while the five tubes to which the numeral 14 is applied constitute the other group the diameter of the tubes of which is such that they may receive either pennies or ten cent pieces.

The end plates 11 and 12 and the intermediate groups of coin receiving tubes are clamped together to thereby form a unitary coin receiving magazine by means of a shaft 15 passing through holes at the center of said plates and having a shoulder 16 against which the lower plate 12 rests and a nut 17 at its upper end adapted to engage the upper plate 11. The shaft 15 is prolonged as at 18, and the lower end thereof enters a guide 19 formed in a support 20 depending from the under side of the supporting plate 9; and 21 is an adjusting screw in threaded engagement with the guide 19 and which serves as a support for the receiving magazine as a whole and by means of which said magazine is capable of a limited vertical adjustment.

The end disks or plates 11 and 12 enter the rabbets 8 and 10 of the hopper and supporting plate and are rotatable in said rabbets about the shaft 15 as an axis for the purpose of adjustment. When the machine is in use the coin receiving magazine is so positioned that the five coin tubes thereof constituting one group, for example the five tubes numbered 13 Fig. 11, will be in communication with the openings in the bottoms of the pockets 3 of the hopper 1, in which condition of adjustment the machine is adapted to count and wrap either quarter dollar or five cent pieces. If it be desired to change the machine to operate upon either pennies or ten cent pieces the coin receiving magazine is rotated about the shaft 15 to bring the tubes 14 of the second group into communication with the pockets 3. In order to hold the coin receiving magazine in either one of the two above mentioned positions I provide the lower plate 12 with two diametrically opposite notches 22, 23 with either one of which a sliding bolt 24 located upon the supporting plate 9 may engage.

The coin receiving tubes 13, 14 are preferably made of glass so that the coins within them may be seen, and they are preferably graduated as shown in Fig. 2ª. Inclined slots 25 are provided adjacent the lower ends of the tubes through which excessively worn or bent coins or coins otherwise defective may be removed by grasping the defective coin by means of a suitable implement and tilting it into an inclined position.

Referring more particularly to Figs. 10 and 11, it will be seen that the portion of the supporting plate 9 which is beneath the pockets 3 of the hopper is provided with a plurality of openings 26 corresponding in number with the number of such pockets and with the number of coin tubes 13 or 14 comprised in each of the two groups of coin tubes. These openings are separated by imperforate portions 27, and the parts of the machine are so arranged that the axis of the coin tubes 13 or 14 when the coin receiving magazine is locked in position by the bolt 24 will be in line with the middle of these imperforate portions so that they will form a support for the lower ends of columns of coins within said tubes. This will be understood from Fig. 10 wherein 28 represents the lowest of a column of coins within the coin receiving tubes, which column is supported by the imperforate portions 27 of the plate 9. The relative location of these parts is also shown in dotted lines in Fig. 11.

Interposed between the lower end plate 12 of the coin receiving magazine and the supporting plate 9 is a rotary counting disk 29 comprising a thin metal plate having a plurality of teeth or projections 30, five such teeth being shown in the embodiment of my invention illustrated in the drawings, this number being selected in order to adapt the machine for operating upon the small coins used in the United States monetary system. This counting disk rotates in a counter-clockwise direction, as shown in Fig. 10, and the following edge of the projections 30 is beveled at 32. These projections it will be seen pass beneath the tubes 13 or 14 when the disk 29 is rotated, and each of said projections will engage the lower one of the columns of coins in each of said coin tubes in succession, and displace said coin from its position at the bottom of a column of coins resting upon the imperforate portion 27 of the supporting plate 9 and move it into or over the openings 26 of said plate. The coins 33, Fig. 10, are shown as having been thus pushed from beneath columns of coins resting upon the adjacent portions 27 of the plate 9 into the openings 26. The purpose of the beveled surface 32 of the teeth 30 is to permit the columns of coins to descend gradually upon the supports 27, as will be understood from Fig. 10, and not suddenly as would be the case if the following edge of the projection 30 were at right angles with the disk 29.

From the above it will be seen that during a complete rotation of the counting disk 29 each of the teeth or projections 30 thereof will displace or push the lowermost coin from the columns of coins in each of the coin tubes with which the machine is provided; and that as five teeth pass successively beneath each coin tube during a complete rotation of the counting disk 29 five successive coins will be pushed from beneath each column of coins during a single rotation of the said counting disk.

The portion of the opening 26 toward which a coin moves as it is pushed from beneath a column of coins is beveled downward as shown at 34, so as to deflect the coin downward into said opening, it being understood that the coins pushed from beneath the columns in the coin tubes pass downward through the openings 26 as hereinafter more fully described.

The counting disk 29 is rotated by means of the handle 35 through the shaft 36 and gears 37, 38 of equal size, see Fig. 5, the shaft 37 being supported at one end in a bearing 38 formed in the depending support 20 and the other end thereof being supported by a second support or hanger 39.

40 is a coupling member engaging a bearing in the hanger 39 and secured to the end of the shaft 36 concentrically therewith, and the handle 35 is provided with a projecting pin 41 which enters and is secured in a hole 42 eccentric to the shaft 37. The purpose of this construction is to provide a crank arm carrying a pawl for operating stopping mechanism next disclosed, and it is evident that as the handle 35 is turned the pin 41 will travel in a path concentric with the axis of the shaft 37 and form a crank the arm of which is the distance between the axis of the said pin and the axis of the said shaft.

42 and 43 are two ratchets secured together so as to form a single unitary member and rotatable upon a bearing 44 carried by the hanger 39. These ratchets are provided one with eight teeth and the other with ten teeth.

45, 46 are two pawls pivoted upon the pin 41, the free ends of which engage the ratchets 42, 43, it being understood that only one of said pawls is in use at a time, the one not in use being turned back so as not to engage the ratchet with which it operates.

From the above it is evident that as the shaft 36 is rotated by means of the handle 35 the ratchets 42 or 43, according to which one is in use, will be advanced one step at each complete rotation of the said shaft by means of the crank formed by the pin 41 and the pawl 45 or 46 which is in use. Thus each rotation of the shaft 36 will advance the two ratchets, they being rigidly connected together, either one tenth or one eighth of a rotation, and ten or eight rotations of said shaft will advance the pawls through a complete rotation. Means are provided for arresting the rotary movement of the ratchets 42, 43 at the end of each complete rotation thereof comprising a stop pin 47 carried by said ratchets and a stop lever 48 pivoted to the hanger 39 at 49. The stop lever is provided with a spring 50 secured thereto at 51.

Assuming that the machine is to operate upon either quarter dollar or five cent pieces, and considering the counting function only as performed by the mechanism thus far disclosed, the operation is as follows. The group of large coin receiving tubes numbered 13 is brought beneath the pockets 3 and said tubes filled with coins from the hopper 1 as above explained. The shaft 36 is now rotated by means of the handle 35 to thereby rotate the counting disk 29, and each rotation thereof will as shown above discharge five coins in succession from the lower end of the column of coins within each of the coin receiving tubes 13. Each rotation of the shaft 36 will also advance the ratchet 42, having eight teeth one step by means of the pawl 45 the other pawl being swung back out of engagement with its ratchet, thereby moving the stop pin 47 from the position shown in Fig. 20 in the direction indicated by the arrow. The rotation of the shaft 36 being continued it will be seen that at the end of eight complete rotations thereof the stop pin 47 will have been moved into the position shown in Fig. 19 and that further movement thereof will be prevented by the engagement of the pin 47 with the spring 50 of the stop lever 48. When the stop lever 48 is operated to depress the end thereof having the spring 50, the said spring takes the position shown in Fig. 20 and the shaft 36 may be again operated; but it will be understood that the stopping of the counting operation as above indicates that collections of coins suitable for wrapping have been accumulated as will hereinafter appear; and that the collections of coins will be wrapped into packages or otherwise disposed of before the counting mechanism above disclosed is operated a second time.

During the eight rotations of the shaft 36 permitted before its movement is arrested as above it will be seen that a total of eight times five, or forty coins will be displaced or pushed from the bottom of the column of coins in each of the coin receiving tubes 13; and that the total value of the coins thus displaced from each column will be ten dollars in the case of quarter dollar pieces, or two dollars in the case of five cent pieces. In a similar way if the machine is to operate upon pennies or ten cent pieces the tubes 14, and the ratchet 43 having ten teeth will be used, in which case ten rotations of the shaft 36 and counting disk 29 are permitted before the stopping mechanism comes into operation; and a total of fifty coins are pushed from the bottom of each column of coins, the value thereof being five dollars in the case of ten cent pieces, or fifty cents in the case of pennies.

From the above it will be appreciated that a plurality of pockets 3 and of coin tubes 13 or 14 is used in order to increase the capacity of the machine, and that the number used is in no way concerned in the counting function. In the above described operation, in the first instance, forty coins are pushed from a column of coins and fall through say the opening 26 shown at the top of Fig. 10, and the same number fall through each of the other openings 26. Thus eight rotations of the shaft 36 count five separate collections of coins, each collection comprising forty separate coins.

Hoppers or funnels 52 are secured to the under side of the supporting plate 9, one beneath each of the openings 26 in said plate, and into which the coins fall after having been displaced by the counting disk 29 as above disclosed. These funnels are so shaped that the lower or discharge end thereof will be directly over coin collecting mechanism to be next described, the purpose of the funnels being to conduct coins from the counting mechanism above described to the collecting mechanism. These funnels are provided with a flange 53 at their lower end to which flange a cover 54 is secured at 55, said cover swinging in the plane of the bottom of the funnel to open or close the lower discharge end thereof. 56 is a knob for operating the cover 54. When the lower end of any given funnel is closed the coins discharged thereinto are prevented from passing to the collecting mechanism; and the purpose of such covers is to retain the coins in a given hopper or funnel in case there are not enough coins in the coin receiving tube above said funnel to make a complete package, which feature will be found to be of advantage in finishing up the counting and packaging of a quantity of coins.

57 are a plurality of counting devices, the purpose of which is to count and register the total number of coins pushed from beneath each of the columns of coins in the coin tubes, and the number of such counting devices is the same as the number of coin receiving tubes used. These counting devices are secured to brackets 58 formed with the supporting plate 9, and are operated by vertically extending rock shafts 59 journaled in bosses 60 formed in said plate. See Fig. 10. Upon the upper ends of the shafts 59 arms 61 are secured, which arms lie in the path of movement of and are engaged by the coins as they are pushed from beneath the column of coins by the counting disk 29. Thus each coin operated upon will engage an arm 61 and operate the counting device with which the same is connected.

62 is the base plate of my machine and 63 are legs whereby said base plate is supported. The supporting plate 9, hopper 1 and base plate 62 are secured together and maintained in proper position relative to one another by means of bolts 64 extending from the base to the hopper, and spacing tubes 65 surrounding said bolts and extending between the base and the supporting plate and other spacing tubes 66 surrounding the bolts and extending between the supporting plate and the hopper.

67 and 68 are two hangers secured to the under side of the base 62 and having bearings at their lower ends for supporting a shaft 69 having a crank handle 70 by means of which it may be rotated, the shaft 69 being the main driving shaft of the machine.

71 is a shaft extending vertically through the base plate 62 and driven from the shaft 69 by means of the gears 72, 73. The lower end of said shaft is supported by the bracket 74 projecting from the hanger 68, and the upper end thereof is made square as at 75, and is threaded as at 76. 77 is a nut engaging with the threaded portion of said shaft and having a reduced portion 78 and a collar 79 detachable therefrom but intended to remain permanently attached to the nut after having been properly adjusted.

80 is an adjustable plate extending across the machine and having guides 81 in engagement with but movable upon the spacing tubes 65, and having also a hole at its center through which the reduced portion 78 of the nut 77 extends.

82 is a part of crimping mechanism to be later described.

The parts 77, 78, 79, 80 and 82 having been assembled as shown in Fig. 5 it is obvious that the adjustable plate 80 and crimping member 82 will be supported from the shaft 71 by means of the nut 77 and collar 79, and that the nut will rotate with the shaft as the connection between the nut and plate 80 is sufficiently loose to permit rotation of the nut. The plate 80 may, it will be understood, thus be adjusted vertically by means of the nut 77.

Interposed between the base plate 62 and the adjustable plate 80 and driven by the vertical shaft 71 is a rotatable coin collecting device designed to receive coins from the counting mechanism above disclosed, and within which the collection of coins may be wrapped with paper, in which case the said device may appropriately be designated as a coin packaging and wrapping magazine; which device comprises circular end plates 83, 84 secured to and spaced apart by a driving hub 85 having a groove 86 to engage the squared portion of the said shaft.

87 are collecting, and, if desired, wrapping tubes, extending between the end plates 83, 84, the ends of said tubes being preferably soldered to the said end plates. These tubes have vertically extending openings 88 extending throughout their length and flared as shown to permit the entrance of a strip of paper for wrapping the coins as will be hereinafter more fully explained. The lower end of the driving hub 85 is prolonged as at 89 and is adapted to enter a hole 90 in the base plate 62 to thereby secure the said magazine from displacement. The end plates 83, 84 are provided each with a slot 91 communicating with the groove 86 of the hub 85 and extending from the hub to the periphery of said plates.

From the above it will be obvious that after lifting the adjustable plate 80 by means of the nut 77 the wrapping magazine may be lifted to disengage the prolongation 89 from the hole 90 and then moved sidewise and removed from the machine, the slots 91 permitting such sidewise movement. The wrapping magazine is replaced in the machine by performing the above operation reversely.

I preferably employ separate wrapping magazines for each kind of coin to be operated upon, because the heights of piles of coins of the several denominations and of the values above mentioned when collected in said magazine will vary, and the magazines are removed from and inserted in the machine as above disclosed, the plate 80 being adjusted to the particular magazine used by means of the nut 77 as above disclosed.

The number of coin collecting or wrapping tubes 87 employed in a wrapping magazine is preferably ten, and, as coins will be wrapped in each of said tubes successively by wrapping mechanism stationary with reference thereto, it is obvious that intermittent motion in increments of one tenth of a revolution must be imparted to said magazine in order to bring the successive wrapping tubes into operative relationship with the wrapping mechanism. To accomplish this the gears 72, 73 drive the shaft 71 intermittently, each movement being through one tenth of a revolution, or through thirty-six degrees; to which end the gear 72 is shown as provided with a single projection or tooth while the gear 73 is shown as having ten depressions into which said tooth may enter, the illustration being intended as a conventional showing of any one of the familiar types or classes of mechanisms in common use for imparting intermittent rotary motion to one shaft from another which rotates continuously. The tubes 87 are provided with openings 92 in their sides so that the coins within the tubes may be seen.

The adjustable plate 80 is provided with a plurality of openings 93 corresponding in number with the number of hoppers 52 and located vertically below the discharge openings of said hopper. Funnels 94 are provided upon the upper side of said plate, which funnels communicate with said openings so as to insure that coins falling from the hoppers 52 will pass through the plate 80 and into the tubes of the wrapping magazine. See Figs. 8 and 9.

The adjustable plate 80 is cut away as at 95 to thereby form a recess and is provided with a seat at 96 upon its under side and within which a folding member 97 is secured, it being understood that the under surface of the plate 80 after the folding member 97 is in place, or the annular portion of said surface which is opposite and nearly in contact with the upper ends of the wrapping tubes 87, is all in one plane. The portion of the base plate 62 which is directly beneath the rotary wrapping magazine is raised so as to be in a higher plane than other portions of said base plate, such raised portion being the circular portion at the left hand end of Fig. 6. This feature is shown in elevation in Figs. 5 and 12. This raised portion of the base plate 62, and also the depressed portion of the base adjacent thereto, is cut away as at 98 to thereby form a second recess similar to the recess 96, see Fig. 6, and a second folding member 99 is secured in a seat formed in said raised portion, it being understood that the annular portion 100 of the upper surface of said raised portion over which the lower ends of the wrapping tubes 87 travel is, after said second folding member is in place, all in one plane. The folding member 99 is directly below the folding member 87 as will be understood from Figs. 1, 16, 17, and 18.

Operating within the cut away portions or recesses 95 and 98 of the plate 80 and base plate 62, which cut away portions are in vertical alinement with one another is crimping mechanism capable of oscillatory movement about the vertical shaft 71 as a center, and comprising an upper arm 82 which has a bearing upon the adjusting nut 77, see Fig. 5, and a lower arm 101 which has a bearing directly upon the shaft 71. The upper arm 82 passes above the adjustable plate 80, see Fig. 8, and through a slot in the hub 102 thereof as will be understood from Figs. 5 and 8. Said arm is bent at 103 so as to bring the lower surface of the outer end thereof downward and into the same plane as the lower surface of the plate 80 as will be understood from Figs. 1 and 12. The lower arm 101 passes beneath the raised portion of the base plate 62, Figs. 1, 5, and 12; and said arm is bent at 104 so as to bring the upper surface of the outer end thereof upward and into the same plane as the annular portion 100 of the raised portion of the base plate 62 over which the lower ends of the wrapping tubes 87 travel. The lower arm 101 is supported by and moves upon a horizontally extending portion 1041 of the hanger 68, and the free end thereof is prolonged and bent upward at right angles as shown at 105, Figs. 1, 12 and 16 to 18; and the portion 105 is provided with an elongated slot 106 through which a rounded and threaded extension 107 of the upper arm 82 passes, a nut 108 being provided for securing the parts together. It will thus be seen that the upper and lower arms of the crimper may be rigidly connected together, and the upper arm is operated from the lower arm as will hereinafter appear. The slot 106 is to enable the parts to be adjusted to different heights of coin packaging and wrapping magazines, as it is evident that the upper arm 82 moves with the plate 80 as said plate is adjusted to accommodate varying heights of magazine as before explained. The upper arm 82 of the crimping member is provided with a projection 109 which is beveled upon its under side as at 110, and the lower arm 101 of the crimping member is provided with a similar projection 111 beveled upon its upper side as at 112. These projections are so located upon the arms that they will be directly above and below the coin wrapping tubes 87, so that the columns of coins in the tubes will be supported by said lower arm as the lower ends of the tubes pass across the recess 98.

113 is a paper roll holding spindle located at the right hand end of the base plate 62 and upon which a roll of paper 114 for wrapping the coins is placed. The strip of paper 115 from said roll passes around a guide 116 and between two pairs of similar paper feeding rolls 117, 118 and 119, 120 the rolls 117 and 119 being positively driven and the rolls 118, 120 being idle rolls, although it is obvious that said idle rolls may be positively driven if desired.

121 is an arm secured to the upper end of a vertical shaft 122 which extends downward through a boss 123 upon the base plate of the machine and is provided at its lower end beneath said plate with a second arm 124 the free end of which is engaged by a tension spring 125. The free end of the arm 121 is provided with a roller 126, which roller bears against the roll of paper 114 to thereby restrain the unwinding thereof and place the strip 115 under slight tension as it is unwound from the roll by the paper feed rolls.

127 are guides extending upward from the base plate and between which the strip of paper 115 passes on its way to the wrapping magazine. It will be understood from Figs. 1, 6 and 7 that the strip of paper 115 in passing to the wrapping magazine traverses the lower portion of the base plate 62, and that the lower edge of said strip is in a plane below the lower ends of the tubes of the coin wrapping magazine, which is located upon the raised portion of the base plate; so that the lower edge of the strip of paper will be some little distance below the bottom of the columns of coins in the tubes of the coin wrapping magazine.

128 is a combined coin supporting and paper feeding roll, so called because of the function it performs, and 129 is an idle roll coöperating therewith. The upper end of this roll is beveled as at 178. The feed rolls 119 and 117 are positively driven from a shaft 130 beneath the base plate of the machine and supported in bearings 131, 132, by means of spiral gears 133, 134 upon said shaft and spiral gears 135, 136 upon shafts passing downward from said feed rolls through bosses 137 upon the base plate as shown in Fig. 13. The shaft 130 is driven by spiral gear 138, 139, Fig. 5, from the main driving shaft 69, by means of gears 140, 141 and a shaft 142 depending from the combined coin supporting and paper feeding roll 128.

The roll last above mentioned in addition to rotary motion imparted to it by the gears 140, 141, has imparted to it an up and down reciprocating motion, the upper end thereof rising to the plane of the lower end of the coin wrapping magazine, as shown in Figs. 1 and 16, and descending to a position slightly below the plane of the lower edge of the strip of wrapping paper 115, as shown in Figs. 5, 17 and 18; and this reciprocating motion is produced by a cam 143 upon the main driving shaft 69, the shaft 142 of the roll 128 having a groove 144 which engages keys in the gears 141 and 139 whereby it may move freely through said gears while maintaining a driving connection therewith. The cam 143 engages a cross head 145 provided upon the lower end of the shaft 142, which cross head is guided in its movements by a guide 146 formed integrally with the hanger 67, and a spring 147 tends to force said cross head downward. Formed integrally with the hanger 67 is a bracket 148 which is grooved to provide a seat for the spiral gear 139; and this bracket also supports the idle roll 129 which is provided with a depending shaft 149, a portion 150 of the bearing for said shaft being yieldable and forced toward the shaft by means of a spring 151 and adjusting set screw 152. The idle roll 120 is provided with a similar bearing, see Fig. 13, having a yieldable portion 153, spring 154, and set screw 155, and the idle roll 118 is provided with similar mechanism. By means of these adjusting features it will be obvious that the force with which the several pairs of feed rolls grip the strip of paper 115 passing between them may be varied to secure a satisfactory forward movement of the strip of paper and to permit the mode of operation next described.

The feed rolls 128, 119 and 117, see Fig. 7, are rotated at the same annular velocity by the gearing heretofore described, but the roll 128 is larger than the rolls 119 and 117, so that while the three rotate at the same rate of speed the strip of paper 115 will be advanced more rapidly by the roll 128 than by the rolls 119 and 117. Mechanism is provided for cutting the strip of paper, preferably between the rolls 119 and 117; and the purpose of the feature above referred to is to feed the severed portion of the strip forward by means of the feed rolls 128, 129 more rapidly than the unsevered portion of the strip is advancing, and around the coins in the tubes in the coin wrapping magazine so as to complete the wrapping of said coins before the following portion of the strip shall have been advanced into such a position that it would be caught by the magazine as it is advanced. The wrapping function is therefore carried out before the following portion of the strip arrives in the vicinity of the feed roll 128. The feed rolls 128, 129 are more firmly pressed together than the feed rolls 119, 120 so that when the former rolls grasp the advancing end of a severed piece of paper to feed it into a wrapping tube at the beginning of a succeeding wrapping operation and, as will appear in the explanation of the operation of the paper feed mechanism, the following end of such severed piece of paper may be drawn through the rolls 119, 120 at a rate which will obviously be faster than the paper would be advanced by said rolls 119, 120.

The relative dimensions of the larger feed roll 128 and each of the smaller feed rolls 119 and 117 may be varied considerably, but I have found a ratio of four to two-and-one-half to secure very satisfactory results.

The shaft 130 for driving the feed rolls is rotated intermittently from the main driving shaft 69 by means of the gears 140 and 141 as above described, to which end the gear 140 has teeth upon a portion only of its periphery as shown in Fig. 23, the length of such toothed portion being sufficient to impart several rotations (about three-and-one-half as shown) to the gear 141 while in engagement therewith, and to then permit the shaft 130 to remain at rest while the shaft 69 completes a rotation.

The mechanism for cutting the strip of paper 115 is as follows. 156 is a reciprocating knife and 157 a stationary knife, the stationary knife being secured to an inclined support or bracket 158 and the reciprocating knife being slotted as at 159 and secured to but free to slide upon an inclined support or bracket 160 by means of screws 161. The knives are preferably inclined as shown so as to cut the strip of paper diagonally, but they may be vertically disposed if desired.

162 is a vertical shaft having a bearing in a boss 163 upon the base plate, and 164 is an arm secured to the upper end of said shaft, the end of said arm being pivotally connected with an extension 165 of the reciprocating knife 156. The knife 156 carries a die 166 having a series of projecting pins 167 which enter a corresponding arranged series of perforations formed in a second die 168 located upon the stationary knife 157. When the knives are brought together the pins 167 enter the openings in the die 168 and in so doing will obviously prick or punch a design in the strip of paper 115 between them. See Fig. 1 wherein dies are shown designed to mark the paper strip with a capital F.

The lower end of the shaft 162 is provided with an arm 169 below the base plate of the machine with which arm the right hand end of a connecting rod 170 is pivotally connected, and the said rod extends longitudinally of the base plate and its left hand end is pivotally connected with the upper end of an oscillating lever 171 at 179. This lever is pivotally supported upon the hanger 68 at 172, and the lower end thereof is bent as shown in Fig. 12. The lever 171 is operated in one direction by a cam 173 upon the main driving shaft 69 which engages the lower end thereof, and a spring 174 operates upon the upper end of said lever to return it to its initial position. The oscillating lever 171 serves also as an operating means for the swinging crimper arms 82 and 101, to which end the upper extremity of said lever is connected with the lower crimper arm 101 by means of a link 175 pivotally secured to the lower arm and pivotally connected with the upper end of said oscillating lever 171 at 180 as best shown in Fig. 12.

From the above it will be understood that the crimping mechanism and the cutting mechanism for the paper strip 115 are operated in unison by means of the cam 173 and oscillating lever 171.

The sequence of operation of the various elements coöperating to wrap coins in the several tubes of the coin wrapping magazine, assuming uniform rotary motion to be imparted to the main driving shaft 69, is as follows. Referring first to Fig. 7, the toothed portion of the gear 140 has engaged with and is driving the pinion 141 and paper feed mechanism connected therewith, the strip of paper 115, has been severed, the right hand or following end thereof has been drawn through and freed from the feed rolls 119, 120 and the advancing end thereof is being fed into a wrapping tube 87 by means of the feed rolls 128, 129 and around a column of coins resting upon the roll 128 but omitted in this figure for the sake of clearness, said roll 128 being in its elevated position so as to support and rotate the column of coins, in which position it is supported by the cam 143 as shown in Fig. 16. The unsevered portion of the strip 115 is being advanced first by the rolls 117, 118, and presently by all four of the rolls 117, 118, 119, 120. This continues for about three-and-one-half complete rotations of the pinion 141 and feed roll 128, at which time the severed portion of the paper strip will have been wrapped about the coins, somewhat less than four complete rotations being sufficient to accomplish this result, and the unsevered end of the paper strip 115 will have been advanced into a position adjacent the coin wrapping magazine but not sufficiently close thereto to be caught by the openings in the tubes 87 thereof when said magazine is advanced. The gear 140 now ceases to drive the pinion 141.

The end portion 178 of the cam 143 now passes the cross head 145 and the roll 128 is permitted to move downward from the column of coins which it has thus far been supporting, and, simultaneously with this downward movement of the roll 128 the crimping arms 82 and 101 are swung to the right, Figs. 1 and 17, by the cam 173 and oscillating lever 171 as above explained and the projections 109 and 111 pass above and below the column or coins and bend in or crimp the portions of the paper wrapping which extend above and below the coins, and, after performing such function they act as a temporary support for the coins as shown in Fig. 17. The beveled portions 110 and 112 of the projections referred to facilitate this action, and the beveled upper end 178 of the roll 128 permits the projection 111 of the lower crimping arm 101 to start to move beneath the column of coins before the said roll leaves them, or simultaneously with such movement, so that there will be no appreciable interval during which the coins will be unsupported. The knife 156 is operated at the same time as the crimping mechanism, these elements being operated by the same cam 173 as explained, and the paper 115 severed. At this time the toothed portion of the gear 72 engages the gear 73 and starts to advance the coin wrapping magazine, which has thus far been at rest, and the cam 173 passes the lower end of the lever 171 and permits the upper end thereof to be drawn to the left by the spring 174. The forward movement of the coin wrapping magazine now carries the partially formed package of coins against the upper and lower stationary folding members 97 and 99, Fig. 18, during which the as yet unfolded projecting portions of the paper wrapping are folded upon the top and bottom of the coins to complete the package. The crimping mechanism having been released as above moves quickly to the left, Fig. 7, and arrives at its extreme left hand position shown in that figure in time to form a support or bridge for the advancing column of coins in the next tube of the coin wrapping magazine and over which they are carried by the advancing wrapping magazine, said column coming to rest upon the coin supporting roll 128 which has been moving upward since the wrapping magazine started to advance, and which reached its highest point just before the forward movement of said magazine ceased. The upward movement of the roll 128 is produced by the cam 143 as hereinbefore explained. The toothed portion of the gear 140 now again engages the pinion 141 and commences to drive the paper feeding mechanism, whereupon the pair of feed rolls 119, 120 advance the severed portion of the strip of paper 115 through the opening in the side of a new wrapping tube and into a position such that the left hand end thereof is grasped by the feed rolls 128, 129, whereupon the severed portion of the strip will be fed into the new wrapping tube, the right hand portion of the severed piece of paper being drawn through the feed rolls 119, 120 by the larger rolls 128, 129, and the free end of the unsevered being meanwhile advanced by the feed rolls 117, 118 until it reaches and passes between the feed rolls 119, 120, after which all four of these rolls coöperate to advance the strip. The parts are now again in their original condition, and the operations above enumerated begin again, it being understood that all of the above operations are carried out in succession in the order mentioned during one single rotation of the main driving shaft 69.

After the package of coins has been wrapped as above disclosed and the ends of the paper folded across the ends thereof, and after the packages pass between the folding members 97 and 99, the folds are held in position as the wrapping magazine continues to advance by contact with the under surface of the adjustable plate 80 and the upper surface of the raised portion of the base plate 62 between which the magazine is moving, whereby the folds at the ends of the coins are smoothed and to a considerable degree are set so that the package will not readily unfold.

The raised portion of the base plate is provided with an opening 176, and the plate 80 is cut away at 177 directly over the opening 176, so that when the packages of coins arrive at the opening 176 they will fall therethrough; or they may be removed from the wrapping magazine by the hand, the recess or cut-away portion of the plate 80 facilitating such manipulation.

The operation of the various separate mechanisms comprising my device has been explained in detail in the foregoing description of such mechanisms. The general operation of the machine, briefly stated is as follows: Coins to be counted and packaged are placed in the hopper and fed into the group of five coin receiving tubes communicating with said hopper. The handle 35 is now turned through eight revolutions, the machine being considered as operating upon quarter dollar pieces, which operation will push forty coins from the lower end of each of the columns of coins in the five coin tubes, which coins will fall through the five hoppers beneath said tubes and into five collecting or wrapping tubes of the coin wrapping mechanism. At the end of eight revolutions of the handle 35 five packages of forty coins each will have been transferred from the hopper to the coin collecting or wrapping magazine, and the rotation of said handle will be arrested at the end of the eighth revolution by the locking mechanism as above explained. The coins in the wrapping magazine are now to be wrapped, to which end the handle 70 is rotated, each rotation of said handle serving to wrap one package of coins and advance the said magazine one step. Five rotations of the said crank will therefore wrap in succession the five packages of coins in said magazine.

The use of five coin receiving tubes, five hoppers, etc., is for the purpose of increasing the capacity of the machine, and is not concerned with the counting and packaging function. Any number of coin receiving tubes may be used: and it is obvious that the number of packages of coins accumulated simultaneously in the coin wrapping magazine will correspond with the number of such coin receiving tubes.

Coins may obviously be received in the hand held beneath any one of the hoppers, in which case the machine will count coin without packaging them; and coins counted by hand or by other types of counting mechanism may be placed in the coin wrapping magazine and the machine thus used to package coins not necessarily counted by it. It will also be obvious that coins counted and collected in the tubes of the coin wrapping magazine may be discharged therefrom without being wrapped by simply omitting the strip of wrapping paper, the main driving shaft being operated the same as if the collections of coins were being wrapped. In this case the said tubes act merely as receptacles or collecting tubes for receiving the collections of counted coins, the machine operating to count coins from a mass containing an indefinite number, and to collect the counted coins into collections containing a definite number of coins and having a definite value.

In case coins are received in the hand held beneath any one of the hoppers it will be obvious that the number of coins received need not be enough to form a complete collection, that is forty, or fifty; from which it follows that the device may be used as a change making device, one revolution of the counting disk and its handle serving to discharge five coins through a given hopper, and easily estimated parts of a rotation serving to discharge from one to four coins according to the number required. When so used the stop for the counting disk is thrown out of operation, and the handle operated each time change is to be made through a part or one or more rotations, according to the amount of change it is desired to get from the machine.

Having thus described my invention and explained the mode of operation thereof, I claim and desire to secure by Letters Patent:

1. In a device of the class described, a hopper; a plurality of coin receiving tubes communicating with said hopper and adapted to receive coins therefrom; means located adjacent the ends of said tubes remote from said hopper for preventing the escape of coins therefrom; means for displacing a coin from the end of each of said tubes remote from said hopper in succession; packaging mechanism comprising a plurality of tubes; means for conducting the coins displaced from said coin receiving tubes into a corresponding number of the tubes of said packaging mechanism; and means for wrapping the several collections of coins in the tubes of said packaging mechanism while they remain therein.

2. In a device of the class described, a hopper; a plurality of coin receiving tubes communicating with said hopper and adapted to receive coins therefrom; means located adjacent the ends of said tubes remote from said hopper for preventing the escape of coins therefrom; means for displacing a coin from the lower end of each of said tubes in succession; packaging mechanism comprising a plurality of tubes; means for conducting the coins displaced from said coin receiving tubes into a corresponding number of the tubes of said packaging mechanism; and means for wrapping the several collections of coins in the tubes of said packaging mechanism while they remain therein.

3. In a device of the class described, a hopper; a plurality of vertically arranged coin receiving tubes beneath and in communication with said hopper and adapted to receive coins therefrom; means located adjacent the lower ends of said tubes for preventing the escape of the coins therefrom; a rotary member located at the lower ends of said tubes and adapted to engage and displace a coin from the lower end of each of said tubes in succession; packaging mechanism located beneath the lower ends of said coin receiving tubes and comprising a plurality of tubes; means for conducting the coins displaced from said coin receiving tubes into a corresponding number of the tubes in said packaging magazine; and means for wrapping the several collections of coins in the tubes of said packaging magazine while they remain therein.

4. In a device of the class described, a hopper; a plurality of coin receiving tubes communicating with said hopper and adapted to receive coins therefrom; means located adjacent the ends of said tubes remote from said hopper for preventing the escape of coins therefrom; means for displacing a coin from the end of each of said tubes remote from said hopper; movable packaging mechanism comprising a plurality of tubes connected together so as to form a unitary coin packaging magazine; means for conducting the coins displaced from said coin receiving tubes into a corresponding number of the tubes of said packaging magazine; means for advancing said packaging magazine in a series of step by step movements; means for wrapping the several collections of coins in the tubes of said magazine while they remain therein, and during the intervals between successive movements of said magazine; and means whereby the wrapped packages of coins are removed from said tubes in succession as said magazine is advanced.

5. In a device of the class described, a hopper; a plurality of vertically arranged coin receiving tubes beneath and in communication with said hopper and adapted to receive coins therefrom; means located adjacent the lower ends of said tubes for preventing the escape of coins therefrom; means for displacing a coin from the lower end of each of said tubes; movable packaging mechanism located beneath the lower ends of said coin receiving tubes and comprising a plurality of tubes connected together so as to form a unitary coin packaging magazine; means for conducting the coins displaced from said coin receiving tubes into a corresponding number of the tubes of said packaging magazine; means for advancing said packaging magazine in a series of step by step movements; means for wrapping the several collections of coins in the tubes of said magazine while they remain therein, and during the intervals between successive movements of said magazine; and means whereby the wrapped packages of coins are removed from said coin tubes in succession as said magazine is advanced.

6. In a device of the class described, a hopper; a plurality of vertically arranged coin receiving tubes beneath and in communication with said hopper and adapted to receive coins therefrom; means located adjacent the lower ends of said tubes for preventing the escape of coins therefrom; a rotary member located at the lower ends of said tubes and adapted to engage and displace a coin from the lower end of each of said tubes in succession; movable packaging mechanism located beneath the lower ends of said coin receiving tubes and comprising a plurality of tubes connected together so as to form a unitary coin packaging magazine; means for conducting the coins displaced from said coin receiving tubes into a corresponding number of the tubes of said packaging magazine; means for advancing said packaging magazine in a series of step by step movements; means for wrapping the several collections of coins in the tubes of said magazine while they remain therein, and during the intervals between successive movements of said magazine; and means whereby the wrapped packages of coins are removed from said tubes in succession as said magazine is advanced.

7. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for rotating said coin wrapping magazine in a series of step by step movements; means for supplying a plurality of coins to be wrapped to each of said tubes; means for feeding strips of paper in succession through the openings in each of said coin tubes and around the coins therein, during the intervals when said magazine is at rest; and means for folding the ends of the paper wrapping thus formed across the ends of the coins to thereby complete the packaging thereof; said base plate being provided with an opening over which said coin tubes pass and through which the packages of coins may fall.

8. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for rotating said coin wrapping magazine in a series of step by step movements; means for supplying a plurality of coins to be wrapped to each of said tubes; means for feeding strips of paper in succession through the openings in each of said coin tubes and around the coins therein, during the intervals when said magazine is at rest; means for folding the ends of the paper wrapping thus formed across the ends of the coins to thereby complete the packaging thereof; said base plate being provided with an opening over which said coin tubes pass and through which the packages of coins may fall; an adjusting plate above said magazine; means for adjusting said plate vertically; and a plurality of funnels carried by said plate and adapted to direct coins into the upper ends of the tubes of said magazine.

9. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for rotating said coin wrapping magazine in a series of step by step movements; means for advancing a strip of wrapping paper toward said magazine; means for severing said strip; means for feeding the severed portions of said strip forward and with increased velocity and through the openings in said coin tubes in succession, and around the coins therein, during the intervals when said magazine is at rest; and means for folding the ends of the paper wrapping thus formed across the ends of the coins to thereby complete the packaging thereof; said base plate being provided with an opening over which said coin tubes pass and through which the packages of coins may fall.

10. In a device of the class described, coin wrapping and packaging mechanism comprising a tube adapted to receive coins to be packaged and having an opening extending lengthwise thereof; means for advancing a strip of wrapping paper toward said tube; means for severing said strip; means for feeding the severed portion of said strip forward and with increased velocity and through the opening in said tube and around the coins therein; and means for folding the ends of the paper wrapping thus formed across the ends of the coins to thereby complete the packaging thereof.

11. In a device of the class described, coin wrapping and packaging mechanism comprising a tube adapted to receive coins to be packaged and having an opening extending lengthwise thereof; a pair of feed rolls for advancing a strip of wrapping paper toward said tube; a second pair of feed rolls for feeding the severed portion of said strip forward and through the opening in said tube and around the coins therein; means for driving both said pairs of feed rolls the arrangement thereof being such that the second pair of feed rolls will advance the severed portion of the strip with increased velocity as compared to the motion imparted to the unsevered portion of said strip; and means for folding the ends of the paper wrapping thus formed across the ends of the coins to thereby complete the packaging thereof.

12. In a device of the class described, coin wrapping and packaging mechanism comprising a tube adapted to receive coins to be packaged and having an opening extending lengthwise thereof; a plurality of pairs of feed rolls for advancing a strip of wrapping paper toward said tube; means for severing said strip; an additional pair of feed rolls for feeding the severed portion of said strip forward and through the opening in said tube and around the coins therein; a shaft whereby all of said feed rolls are operated at uniform angular velocity, said last mentioned feed rolls being of larger diameter than said first mentioned feed rolls to thereby advance the severed portion of said strip of paper at a velocity greater than said strip is advanced by said first mentioned feed rolls; and means for folding the ends of the paper wrapping thus formed across the ends of the coins to thereby complete the packaging thereof.

13. In a device of the class described, a coin wrapping and packaging mechanism comprising a vertical tube adapted to receive coins to be packaged and having an opening extending lengthwise thereof; a vertically reciprocating and rotating feed roll adapted to be moved into a position adjacent the lower end of said tube to form a support for the coins therein and to recede from such position; a second roll coöperating with said first mentioned feed roll; means for operating said first mentioned feed roll; a second pair of feed rolls for advancing a strip of wrapping paper toward and in position such that it will be caught by said first mentioned feed rolls and carried around the coins in said tube; means for operating said pairs of feed rolls, the arrangement of said operating means being such that said first mentioned pair of feed rolls will advance the paper faster than said second mentioned pair of feed rolls; and means for folding the ends of the paper wrapping thus formed across the ends of the coins to thereby complete the packaging thereof.

14. In a device of the class described, a coin wrapping and packaging mechanism comprising a vertical tube adapted to receive coins to be packaged and having an opening extending lengthwise thereof; a vertically reciprocating and rotating feed roll adapted to be moved into a position adjacent the lower end of said tube to form a support for the coins therein and to recede from such position, a second roll coöperating with said first mentioned feed roll; a second pair of feed rolls for advancing a strip of wrapping paper into a position such that it will be caught by said first mentioned feed rolls and carried around the coins in said tube, a shaft for operating both said pairs of feed rolls at uniform angular velocity, the diameter of said first mentioned pair of feed rolls being greater than the diameter of said second mentioned feed rolls whereby said first mentioned pair of feed rolls will advance the paper faster than said second mentioned pair of feed rolls; and means for folding the ends of the paper wrapping thus formed across the ends of the coins to thereby complete the packaging thereof.

15. In a device of the class described, coin wrapping and packaging mechanism comprising a vertical tube adapted to receive coins to be packaged and having an opening extending lengthwise thereof; a vertically reciprocating and rotating feed roll adapted to be moved into a position adjacent the lower end of said tube to form a support for the coins therein, and to recede from such position; means for operating said roll; means for advancing a strip of wrapping paper into position such that it will be caught by said roll and carried around the coins in said tube; and means for folding the ends of the paper wrapping thus formed across the ends of the coins to thereby complete the packaging thereof.

16. In a device of the class described, coin wrapping and packaging mechanism comprising a vertical tube adapted to receive coins to be packaged and having an opening extending lengthwise thereof; a vertically reciprocating and rotating feed roll adapted to be moved into a position adjacent the lower end of said tube to form a support for the coins therein, and to recede from such position; means for operating said roll; means for advancing a strip of wrapping paper into position such that it will be caught by said roll and carried around the coins in said tube; means for folding the ends of the paper wrapping thus formed across the ends of the coins to thereby complete the packaging thereof; and folding mechanism including a crimping member adapted to move beneath said coins as said roll recedes therefrom to thereby crimp the paper wrapping and form a support for the coins.

17. In a device of the class described, a base plate having a portion thereof cut away to thereby form a recess; an adjusting plate located above said base plate and provided also with a recess; a rotary coin wrapping and packaging magazine located between said base plate and said adjusting plate and comprising a plurality of vertically arranged tubes and means for connecting said tubes together to thereby form a single unitary structure, said tubes having each an opening extending lengthwise thereof and the lower ends of said tubes moving in contact with the surfaces of said base plate and said adjusting plate and past to recesses formed therein; means for rotating said magazine in a series of step by step movements; means for supplying a plurality of coins to be wrapped to each of said tubes; a reciprocating crimping member operating in the recessed portions of said base plate and said adjusting plate and adapted to form a support for the coins as the tubes pass across said recesses, a reciprocating coin support adapted to move into a position adjacent the lower ends of said tubes to thereby form a support for the coins therein, and to recede from such position, said coin support also operating in the recessed portion of said base plate and being adapted to receive the coins after they leave said crimping member; means for feeding strips of paper in succession through the openings in each of said coin tubes and around the coins therein, during the intervals when said magazine is at rest, and while the coins are supported by said coin supports; means for simultaneously depressing said coin support and advancing said crimping member beneath said coins to thereby crimp the ends of the paper wrapping about the coins across the ends thereof, and to again form a support for the coins; and stationary folding devices carried by said base plate and said adjusting plate and between which said coins are carried by the forward movement of the magazine and whereby the ends of the paper wrapping are folded across the ends of the coins to thereby complete the packaging thereof; said base plate being provided with an opening over which said coin tubes pass and through which the packages of coins may fall.

18. In a device of the class described, a base plate having a portion thereof cut away to thereby form a recess; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate and over the recess formed therein; means for rotating said magazine in a series of step by step movements; means for supplying a plurality of coins to be wrapped to each of said tubes; a reciprocating crimping member operating in the recessed portion of said base plate and adapted to form a support for the coins as the tubes pass across said recess; a reciprocating coin support adapted to move into a position adjacent the lower ends of said tubes to thereby form a support for the coins therein, and to recede from such position, said coin support also operating in the recess of said base plate and being adapted to receive the coins after they leave said crimping member; means for feeding strips of paper in succession through the openings in each of said coin tubes and around the coins therein, during the intervals when said magazine is at rest, and while the coins are supported by said coin support; means for simultaneously depressing said coin support and advancing said crimping member beneath said coins to thereby crimp the ends of the paper wrapping about the coins across the ends thereof, and to again form a support for the coins; and means for folding the ends of the paper wrapping across the ends of the coins to thereby complete the packaging thereof; said base plate being provided with an opening over which said coin tubes pass and through which the packages of coins may fall.

19. In a device of the class described, a base plate having a portion thereof cut away to thereby form a recess; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate and over the recess formed therein; means for rotating said magazine in a series of step by step movements; means for supplying a plurality of coins to be wrapped to each of said tubes; a reciprocating crimping member operating in the recessed portion of said base plate and adapted to form a support for the coins as the tubes pass across said recess; a combined coin support and paper feed device comprising a reciprocating and rotating feed roll adapted to move into a position adjacent the lower ends of said tubes to thereby form a support for the coins therein, and to recede from such position, said feed roll also operating in the recess of said base plate and being adapted to receive the coins after they leave said crimping member; a second roll coöperating with said first mentioned feed roll; means for feeding strips of paper in succession through the openings in each of said coin tubes and into position such that they will be grasped by said feed rolls and carried around the coins in said tubes, during the intervals when said magazine is at rest, and while the coins are supported by said reciprocating feed roll; means for simultaneously depressing said reciprocating feed roll and advancing said crimping member beneath said coins to thereby crimp the ends of the paper wrapping about the coins across the ends thereof, and to again form a support for the coins; and means for folding the ends of the paper wrapping across the ends of the coins to thereby complete the packaging thereof; said base plate being provided with an opening over which said coin tubes pass and through which the packages of coins may fall.

20. In a device of the class described; a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for supplying a plurality of coins to be wrapped to each of said tubes; means for advancing a strip of wrapping paper toward said magazine; means for severing said strip; means for feeding the severed portions of said strip forward and at increased velocity and through the openings in said coin tubes in succession and around the coins therein, during the intervals when said magazine is at rest; and means for folding the ends of the paper wrapping thus formed across the ends of the coins to thereby complete the packaging thereof; said base plate being provided with an opening over which said coin tubes pass and through which the packages of coins may fall.

21. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; a vertical shaft for operating said magazine; a main operating shaft supported by said base plate; gearing between said main shaft and said magazine shaft whereby said latter shaft is operated intermittently; means for supplying a plurality of coins to be wrapped to each of said tubes; paper feeding rolls for advancing a strip of wrapping paper toward said magazine; a reciprocating knife for severing said strip; a cam upon said main shaft for operating said knife; additional paper feed rolls for feeding the severed portions of said strip forward and at increased velocity and through the openings in said coin tubes in succession, and around the coins therein, during the intervals when said magazine is at rest; a shaft for operating all of said feed rolls; gearing between said paper feed roll shaft and said main shaft whereby said former shaft is operated intermittently; and means for folding the ends of the paper wrapping thus formed across the ends of the coins to thereby complete the packaging thereof; said base plate being provided with an opening over which said coin tubes pass and through which the packages of coins may fall.

22. In a device of the class described, a base plate having a portion thereof cut away to thereby form a recess; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate and over the recess formed therein; a vertical shaft for operating said magazine; a main operating shaft supported by said base plate; gearing between said main shaft and said magazine shaft whereby said latter shaft is operated intermittently; means for supplying a plurality of coins to be wrapped to each of said tubes; an oscillating crimping arm pivoted to said magazine shaft and having a crimping member operating in the recessed portion of said base plate and adapted to form a support for the coins as the tubes pass across said recess; a cam upon said main shaft; a lever operated thereby; connections between the upper end of said lever and said crimping mechanism; a combined coin support and paper feed device comprising a reciprocating and rotating feed roll adapted to move into a position adjacent the lower ends of said tubes to thereby form a support for the coins therein, and to recede from such position, said feed roll also operating in the recess of said base plate and being adapted to receive the coins after they leave said crimping member; a cam upon said main shaft for operating said feed roll; an idle roll coöperating with said first mentioned feed roll; an additional pair of paper feed rolls for advancing strips of paper in succession through the openings in each of said coin tubes and into position such that they will be grasped by said first mentioned feed rolls and carried around the coins in said tubes, during the intervals when said magazine is at rest, and while the coins are supported by said reciprocating feed roll; a shaft for operating both said pairs of paper feed rolls, gearing between said main shaft and said feed roll shaft for operating said latter shaft intermittently; and means for folding the ends of the paper wrapping across the ends of the coins to thereby complete the packaging thereof, the movement of said crimping member and said reciprocating feed roll being so timed that said crimping member is advanced to a position beneath said coins as said reciprocating roll moves downward to thereby crimp the paper wrapping across the ends of the coins and again form a support for said coins.

23. In a device of the class described, a base plate having a portion thereof cut away to thereby form a recess; an adjusting plate located above said base plate and provided also with a recess; a rotary coin wrapping and packaging magazine located between said base plate and said adjusting plate and comprising a plurality of vertically arranged tubes and means for connecting said tubes together to thereby form a single unitary structure, said tubes having each an opening extending lengthwise thereof and the lower ends of said tubes moving in contact with the surfaces of said base plate and said adjusting plate and past to recesses formed therein; a vertical shaft for operating said magazine; a main driving shaft; gearing between said main driving shaft and said magazine shaft for operating said magazine shaft intermittently; means for supplying a plurality of coins to each of said tubes; an oscillating arm pivoted to said magazine shaft and having a crimping member adapted to operate in the recessed portions of said base plate and said adjusting plate and to form a support for the coins as the tubes pass across said recesses; a cam upon said main shaft; an oscillating lever operated by said cam; a connection between said oscillating lever and said crimping arm whereby said arm is operated; a combined coin support and paper feed device comprising a reciprocating and rotating feed roll adapted to move into a position adjacent the lower ends of said tubes to thereby form a support for the coins therein, and to recede from such position, said feed roll also operating in the recess of said base plate and being adapted to receive the coins after they leave said crimping member; an idle roll coöperating with said first mentioned feed roll; a second pair of paper feed rolls adapted to advance a strip of paper; a reciprocating knife for severing said strip; a third pair of paper feed rolls adapted to advance the severed strips of paper toward said magazine and through the openings in said coin tubes and into position such that said severed strips will be grasped by said first mentioned feed rolls and carried around the coins in said tubes, the diameter of said first mentioned feed roll being greater than the diameter of said third feed rolls; a shaft for operating all of said feed rolls; gearing whereby said feed roll shaft is driven from said main shaft intermittently; stationary folding devices carried by said base plate and said adjusting plate and between which said coins are carried by the forward movement of the magazine and whereby the ends of the paper wrapping are folded across the ends of the coins to thereby complete the packaging thereof; and a rod connecting said crimper operating lever with said reciprocating knife whereby said knife and said crimper are operated in unison, the adjustment of the operating means of the crimping mechanism and the reciprocating feed roll being such that said feed roll moves downward as said crimping member advances into a position beneath the coins to thereby crimp the ends of the wrapping paper and again form a support for the coins.

24. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for rotating said coin wrapping magazine; means for supplying a plurality of coins to be wrapped to each of said tubes; means for feeding strips of paper through the openings in each of said coin tubes, and around the coins therein; and means for folding the ends of the paper wrapping thus formed across the ends of the coins to thereby complete the packaging thereof.

25. In a device of the class described, a base plate; a rotary coin wrapping and packaging magazine comprising a plurality of vertically arranged tubes and means for connecting said tubes together to thereby form a single unitary structure, said tubes having each an opening extending lengthwise thereof and the lower ends of said tubes moving in contact with the surface of said base plate; means for rotating said coin wrapping magazine; means for supplying a plurality of coins to be wrapped to each of said tubes; means for feeding strips of paper through the openings in each of said coin tubes and around the coins therein; means for folding the ends of the paper wrapping thus formed across the ends of the coins to thereby complete the packaging thereof; an adjusting plate above said magazine; means for adjusting said plate vertically; and a plurality of funnels carried by said plate and adapted to direct coins into the upper ends of the tubes of said magazine.

26. In a device of the class described, a coin wrapping and packaging mechanism comprising a vertical tube adapted to receive coins to be packaged and having an opening extending lengthwise thereof; a vertically reciprocating and rotating paper feed roll adapted to be moved into a position adjacent the lower end of said tube to form a support for the coins therein and to recede from such position; a second roll coöperating with said first mentioned feed roll; means for reciprocating said first mentioned feed roll; additional paper feed mechanism comprising a plurality of coöperating pairs of feed rolls for advancing a strip of wrapping paper toward and into position such that it will be caught by said first mentioned feed rolls and carried around the coins in said tube; means for operating all of said feed rolls, the arrangement of such operating means being such that said first mentioned pair of feed rolls will advance the paper faster than said additional pairs of paper feeding rolls; and means for folding the ends of the paper wrappings thus formed across the ends of the coins to thereby complete the packaging thereof, and means for severing said strip of paper between said coöperating pairs of feed rolls.

27. In a device of the class described, a coin wrapping and packaging mechanism comprising a vertical tube adapted to receive coins to be packaged and having an opening extending lengthwise thereof; a vertically reciprocating and rotating paper feed roll adapted to be moved into a position adjacent the lower end of said tube to form a support for the coins therein and to recede from such position; a second roll coöperating with said first mentioned feed roll; means for reciprocating said first mentioned feed roll; additional paper feed mechanism comprising a plurality of coöperating pairs of feed rolls for advancing the strip of wrapping paper toward and into position such that it will be caught by said first mentioned feed rolls and carried around the coins in said tube; a shaft for operating all of said feed rolls at uniform angular velocity, the diameter of said first mentioned pair of feed rolls being greater than the diameter of said additional pairs of feed rolls whereby said first mentioned pair of feed rolls will advance the paper faster than said second mentioned pairs of feed rolls; means for folding the ends of the paper wrapping thus formed across the ends of the coins to thereby complete the packaging thereof, and means for severing said strip of paper between said coöperating pairs of feed rolls.

This specification signed and witnessed this 10th day of Oct., A. D. 1908.

JOHN JAMES FARRELL.

In the presence of—
JAMES F. TUOHEY,
WILLIAM GILLESPIE.